United States Patent
Toyoda et al.

(10) Patent No.: US 12,232,913 B2
(45) Date of Patent: Feb. 25, 2025

(54) DENTURE, REFERENCE DENTURE, AND DENTURE MANUFACTURING METHOD

(71) Applicant: TOKUYAMA DENTAL CORPORATION, Tokyo (JP)

(72) Inventors: Mana Toyoda, Tokyo (JP); Ayumu Gyakushi, Tokyo (JP); Tatsuya Yamazaki, Tokyo (JP)

(73) Assignee: TOKUYAMA DENTAL CORPORATION (JP)

( * ) Notice: Subject to any disclaimer, the term of this patent is extended or adjusted under 35 U.S.C. 154(b) by 427 days.

(21) Appl. No.: 17/440,218

(22) PCT Filed: Mar. 4, 2020

(86) PCT No.: PCT/JP2020/009020
§ 371 (c)(1),
(2) Date: Sep. 17, 2021

(87) PCT Pub. No.: WO2020/195623
PCT Pub. Date: Oct. 1, 2020

(65) Prior Publication Data
US 2022/0142757 A1 May 12, 2022

(30) Foreign Application Priority Data

Mar. 28, 2019 (JP) ................................ 2019-064187
Nov. 11, 2019 (JP) ................................ 2019-204270

(51) Int. Cl.
*A61C 13/01* (2006.01)
*A61C 11/08* (2006.01)
(Continued)

(52) U.S. Cl.
CPC ............ *A61C 13/04* (2013.01); *A61C 11/081* (2013.01); *A61C 13/0024* (2013.01); *A61C 13/097* (2013.01); *A61C 13/1003* (2013.01)

(58) Field of Classification Search
CPC .................. A61C 13/0024; A61C 13/0025
See application file for complete search history.

(56) References Cited

U.S. PATENT DOCUMENTS 2,165,597 A * 7/1939 Widoe, Sr. .......... A61C 13/0024
12/142 EV
3,464,111 A * 9/1969 Gillard ................... A61C 19/05
433/171
(Continued)

FOREIGN PATENT DOCUMENTS

CA 2996484 A1 3/2017
DE 102007031229 A1 * 1/2009 ......... A61C 13/0025
(Continued)

OTHER PUBLICATIONS

Russian office action for corresponding Application No. 2021131026 dated Mar. 29, 2022, with English translation (4 Pages).
(Continued)

*Primary Examiner* — Heidi M Eide
(74) *Attorney, Agent, or Firm* — Harness, Dickey & Pierce, P.L.C.

(57) ABSTRACT

A denture including a denture base where artificial teeth are fixed, the denture base includes a reference denture base member to which the artificial teeth are fixed and an adjusting member formed of a cured body of a curable denture base material, the adjusting member being joined to the reference denture base member, the adjusting member includes an anterior adjusting member that is joined to a mucosal surface of a base anterior region to form an anterior region together with the base anterior region, and a posterior adjusting member that is joined to a mucosal surface of a base posterior region to form a posterior region together with the base posterior region, and at least parts of base edge side distal end regions in the anterior region and the poste- (Continued)

rior region are formed of the anterior adjusting member and the posterior adjusting member, respectively.

2 Claims, 12 Drawing Sheets

(51) Int. Cl.
*A61C 13/00* (2006.01)
*A61C 13/097* (2006.01)
*A61C 13/10* (2006.01)

(56) References Cited

U.S. PATENT DOCUMENTS

| | | | |
|---|---|---|---|
| 3,987,546 A | | 10/1976 | Trampe |
| 4,017,971 A | | 4/1977 | Hazar |
| 4,251,215 A | | 2/1981 | May et al. |
| 2007/0190488 A1 | * | 8/2007 | Rusler ............... A61C 13/0025 433/171 |
| 2015/0147719 A1 | * | 5/2015 | Wallace ............ A61C 13/0024 433/171 |
| 2017/0258564 A1 | | 9/2017 | Wallace |
| 2020/0113662 A1 | * | 4/2020 | Clemens ............ A61C 13/082 |

FOREIGN PATENT DOCUMENTS

| | | | | |
|---|---|---|---|---|
| JP | 08280712 A | * | 10/1996 | |
| JP | 2001-46404 A | | 2/2001 | |
| JP | 2001-149387 A | | 6/2001 | |
| JP | 3449733 B2 | | 9/2003 | |
| JP | 2013-144648 A | | 7/2013 | |
| JP | 2015-165850 A | | 9/2015 | |
| JP | 6294706 B2 | | 3/2018 | |
| WO | WO-02080806 A1 | * | 10/2002 | ......... A61C 13/0024 |
| WO | 2009-122499 A1 | | 10/2009 | |
| WO | 2018-207867 A1 | | 11/2018 | |

OTHER PUBLICATIONS

Chinese office action for corresponding Application No. 202080021058.8 dated May 12, 2022, with English translation (13 Pages).

International Search Report (English and Japanese) of the International Searching Authority issued in PCT/JP2020/009020, mailed Jun. 9, 2020; ISA/JP (5 pages).

* cited by examiner

DENTURE, REFERENCE DENTURE, AND DENTURE MANUFACTURING METHOD

CROSS REFERENCE TO RELATED APPLICATIONS

This is a U.S. national stage of application No. PCT/JP2020/009020, filed on Mar. 4, 2020. Priority under 35 U.S.C. § 119(a) and 35 U.S.C. § 365(b) is claimed from Japanese Patent Applications No. 2019-064187 filed on Mar. 28, 2019 and Patent Applications No. 2019-204270 filed on Nov. 11, 2019, the disclosures of which are expressly incorporated herein by reference in their entireties.

BACKGROUND

Technical Field

The present invention relates to a denture, a reference denture, and a production method for a denture.

Related Art

Along with the rapid population aging in recent years, there is an increasing demand for dentures. Dentures are usually produced one by one in conformity with the shape of an oral cavity of a patient while making fine adjustments by a manual operation.

As a technology of producing a denture while reducing labor of the above-mentioned manual operation, a technology using a reference denture (see JP 3449733 B, JP 6294706 B, and WO 2018/207867 A1) is known. Regarding such a technology, in JP 3449733 B, there is described "a denture production set comprising a combination of a reference denture base prepared in advance, a polymerizable resin composition to be applied to a contact surface of the denture base with respect to oral surface, artificial teeth each having a recess to be filled with a polymerizable resin composition on a tooth top portion (occlusal surface), and the polymerizable resin composition to be filled into the recess of each of the artificial teeth". Then, in Example of JP 3449733 B, the following description is given: "An occlusal surface of each of commercially available artificial teeth was removed into a cylindrical shape of from 1 mm to 3 mm through use of a drill, to thereby produce artificial teeth each having a recess for adding a polymerizable resin on the occlusal surface side. A wax denture was produced from an entire toothless jaw model for educational training in accordance with a conventional method. One layer of a portion thereof that was brought into contact with a mucosa (entire palatal plate portion in the case of an upper jaw) was removed to pull out artificial teeth. A gum portion of a denture base was produced on the resultant by subjecting a copolymerization resin of methyl methacrylate and 2-ethylhexyl acrylate (75:25) to compression molding through use of a mold produced from an original mold of a reference denture base. Commercially available artificial teeth were arranged in anterior teeth portions and maxillary posterior teeth portions, and the artificial teeth each having a recess of the present invention were arranged in mandibular posterior teeth portions, to thereby obtain a reference denture base. In addition, as a component for a palatal portion, a product obtained by heating and softening a plate of the above-mentioned copolymer having a thickness of 0.5 mm and pressing the resultant against a mold having a shape of the palatal portion to define a form was prepared."

In addition, in JP 6294706 B, there is disclosed a reference denture base having a specific planar shape determined based on oral cavity shapes of a dentulous person and an edentulous person. Specifically, in JP 6294706 B, there is disclosed a reference denture base having the following shape in which the length of a line segment connecting a first reference point corresponding to a left pterygomaxillary notch of the trailing edge of the floor and a left retromolar pad on a plate posterior edge and a second reference point corresponding to a right pterygomaxillary notch and a right retromolar pad is defined as a reference length, and the lengths from a plurality of points defined at predetermined positions on two reference line segments connecting a third reference point corresponding to an upper (lower) lip zonule, which corresponds to the midline portion of a labial flange border, to the first reference point and the second reference point, respectively, to the denture border are set so that ratios of the lengths to the above-mentioned reference length fall within a predetermined range. Further, in JP 6294706 B, there is described that artificial teeth are arranged on the above-mentioned reference denture base to form a reference denture, and after a liner is built on the reference denture base, the resultant is worn in an oral cavity of an individual patient as a trial to make occlusion adjustment, to thereby obtain a denture matched with the shape of the oral cavity of the individual patient.

Further, in WO 2018/207867 A1, there is disclosed a jig configured to perform positioning of a reference denture. This jig is used for placing the reference denture at an appropriate position, for example, in an oral cavity of a patient. The jig includes a reference denture holding portion configured to hold the reference denture, and under a state in which the reference denture is held in the reference denture holding portion, the reference denture is guided into the oral cavity or an articulator having toothless maxillary and mandibular models fixed thereto, thereby being capable of performing positioning of the reference denture. In addition, in WO 2018/207867 A1, there is also disclosed a production method for a denture characterized in that a liner is built on an inner surface side of the reference denture, and then the shape is marked on the liner built on the reference denture.

Technical Problem

As described above, in JP 3449733 B and JP 6294706 B, there is disclosed a technology based on the concept that the liner is built on a mucosal surface (basal surface) of the reference denture base formed of a ready-made denture base of a complete denture type and pressed against a mucosa in an oral cavity of a patient so as to be adapted thereto. In addition, in JP 6294706 B, there is described the advantage of using the reference denture (base), specifically, described that the reference denture (base) can be easily adapted to the shape of the oral cavity of the patient merely by building the liner on the reference denture (plate), and hence the production time of a denture can be shortened. Then, according to JP 6294706 B, the adaptability ratio for a large number of patients can also be increased to, for example, as high as 90% by forming the reference denture (base) into the above-mentioned specific planar shape, and the advantage of using the above-mentioned reference denture (base) can be obtained in a large number of cases merely by selecting a size adapted to an oral cavity size of a patient.

However, as described below, it cannot be said that a method of efficiently producing a denture that is fitted to an individual patient through use of a reference denture base or a reference denture has been established. That is, the reference denture base disclosed in JP 3449733 B is merely produced through use of an entire toothless jaw model for educational training, and there is no description regarding the specific shape thereof. In addition, in JP 3449733 B, there is no disclosure of a detailed procedure or the like of a production method for a denture through use of the above-mentioned reference denture base.

Further, in JP 6294706 B, regarding the production procedure before the liner is built on the reference denture base or the reference denture, it is simply stated that the one adapted to the oral cavity size of the patient is selected, and the detail thereof is unknown. The reference denture (or the reference denture base) is a material member for producing a denture (or a denture base), and means a ready-made denture-like (denture base-like) member having a predetermined shape in which a portion corresponding to a denture base is slightly smaller (thinner or narrower in area) than a denture (or a denture base) to be produced. In such a reference denture (or a reference denture base), several sizes (for example, an S-size, an M-size, an L-size, etc.) can be prepared so that the reference denture (or the reference denture base) can be applied to a standard oral cavity size of a patient. However, the number of sizes is not so large. Accordingly, even when it is determined that the reference denture (or the reference denture base) can be used in terms of a size, it is required to actually allow a patient to try it on and confirm the adaptability.

Specifically, a simple preliminary check is generally performed, which involves inserting a reference denture for an upper jaw (maxillary reference denture) and/or a reference denture for a lower jaw (mandibular reference denture) into an oral cavity of a patient so that an appropriate occlusal state is kept and checking the presence or absence of a portion that comes into contact with a mucosa or the like in an inappropriate manner (manner of contact. Hereinafter sometimes referred to as "inappropriate contact") which may cause pain when the denture is worn for a long period of time. Then, in a stage of this preliminary check, it may be found that adjustment by grinding is required, and in such a case, it is required to make preliminary adjustment by grinding using a handy grinder or the like. Such preliminary adjustment requires countermeasures against dust generated when the amount of grinding is large, as well as equipment such as a handy grinder. Further, depending on the grinding technique of an operator, the denture production time is significantly increased. However, in JP 6294706 B, such a preliminary check and adjustment by grinding are not particularly taken into consideration.

The present invention has been made in view of the above-mentioned circumstances, and an object of the present invention is to achieve at least one of the following first to third objects. The first object is to provide a denture including a material member formed of a reference denture as a constituent member that is considered to enable a denture fitted to an individual patient to be efficiently produced, which can be produced with higher total efficiency also including a preliminary check and adjustment by grinding without decreasing a fitting property to the individual patient.

In addition, the second object is to provide a reference denture that can be used as a material member of a denture, which can significantly reduce the occurrence ratio of cases in which adjustment by grinding is determined to be required in a preliminary check.

In addition, the third object is to provide a production method for a denture capable of efficiently producing a denture that achieves the first object.

SUMMARY

The present invention has been made to achieve the above-mentioned objects, and according to a first aspect of the present invention, there is provided a denture including a denture base where artificial teeth are fixed, the denture base includes a reference denture base member to which the artificial teeth are fixed and an adjusting member formed of a cured body of a curable denture base material, the adjusting member being joined to the reference denture base member. In a state in which the denture is worn in an oral cavity of a patient, when, in the denture, a direction on a labial side is defined as an "anterior side", a direction on a throat side is defined as a "posterior side", and a side facing an alveolar ridge mucosa in the oral cavity of the patient is defined as a "mucosal side", and when, in the denture base and the reference denture base member, a surface on the mucosal side is defined as a "mucosal surface", a surface on an opposite side to the mucosal surface is defined as a "polished surface", and a boundary between the mucosal surface and the polished surface is defined as a "denture border", the denture base includes a central region having the mucosal surface covering a mucosa of an alveolar crest region in the oral cavity of the patient, an anterior region having the mucosal surface covering a mucosa in the oral cavity of the patient anterior to the alveolar crest region, and a posterior region having the mucosal surface covering a mucosa in the oral cavity of the patient posterior to the alveolar crest region, the reference denture base member includes a base central region, a base anterior region, and a base posterior region, the adjusting member includes a central adjusting member that is joined to the mucosal surface of the base central region to form the central region together with the base central region, an anterior adjusting member that is joined to the mucosal surface of the base anterior region to form the anterior region together with the base anterior region, and a posterior adjusting member that is joined to the mucosal surface of the base posterior region to form the posterior region together with the base posterior region, and at least parts of denture border side distal end regions in the anterior region and the posterior region are formed of the anterior adjusting member and the posterior adjusting member, respectively.

In addition, it is preferred that, in the denture according to the above-mentioned invention, 80% or more of the denture border side distal end region of the denture border in the anterior region be formed of the anterior adjusting member, and 80% or more of the denture border side distal end region of the denture border in the posterior region be formed of the posterior adjusting member.

In addition, it is preferred that, in the denture according to the above-mentioned invention, a shape of the adjusting member be adjusted in conformity with a shape of the oral cavity of the patient, and, through adjustment of the shape, in a state in which the denture is worn in the oral cavity of an individual patient to be a wearer, the adjusting member form an occlusal surface on which teeth of an upper jaw and a lower jaw (here, the teeth are artificial teeth fixed to the denture, and natural teeth when the patient has the natural teeth) are brought into close contact with each other and which is a curved surface that is allowed to be approximated with a plane.

In addition, it is preferred that, in the denture according to the above-mentioned invention, when at least one of the artificial teeth is defined as an essential artificial tooth, the essential artificial tooth be selected from the group consisting of a first premolar, a second premolar, a first molar, and a canine, and when a boundary portion of the anterior polished surface of the denture base with the artificial tooth is defined as a "cervical line", a portion forming a wing-like form from the cervical line to the denture border is defined as a "flange", and a portion on an anterior side of the flange having the cervical line of the essential artificial tooth as a proximal end and having the denture border on an extension of the cervical line as a distal end is defined as an "essential artificial tooth anterior flange portion", a denture border portion of the essential artificial tooth anterior flange portion in the at least one essential artificial tooth among one or a plurality of the essential artificial teeth be formed of the anterior adjusting member, and 5% or more and 65% or less of the polished surface of the essential artificial tooth anterior flange portion be formed of the anterior adjusting member.

In addition, it is preferred that, in the denture according to the above-mentioned invention, the denture be a maxillary denture, the essential artificial teeth include a canine artificial tooth (artificial canine), the denture base be a maxillary denture base including a "palatal plate portion" covering a palatal mucosa posterior to the alveolar crest region in the upper jaw of the patient as the posterior region, the palatal plate portion include a "palatal plate adjusting portion" formed of the posterior adjusting member, and at least a part of the denture border of the essential artificial tooth anterior flange portion of the artificial canine be formed of the anterior adjusting member, and 10% or more and 65% or less of the polished surface of the essential artificial tooth anterior flange portion be formed of an exposed surface of the anterior adjusting member.

In addition, it is preferred that, in the denture according to the above-mentioned invention, the denture be a mandibular denture, the essential artificial teeth include a canine artificial tooth (artificial canine), the denture base be a mandibular denture base including a "lingual flange portion" covering a lingual alveolar ridge mucosa posterior to the alveolar crest region in the lower jaw of the patient as the posterior region, the posterior flange portion include a "lingual flange adjusting portion" formed of the posterior adjusting member, and at least a part of the denture border of the essential anterior flange portion of the artificial canine be formed of the anterior adjusting member, and 5% or more and 60% or less of the polished surface of the essential artificial tooth anterior flange portion be formed of an exposed surface of the anterior adjusting member.

In addition, according to a second aspect of the present invention, there is provided a reference denture, which is to be used as a reference denture member including the reference denture base member and the artificial teeth in the denture of the present invention.

It is preferred that, in the reference denture according to the present invention, when at least one of the artificial teeth is defined as an essential artificial tooth, the essential artificial tooth be selected from the group consisting of a first premolar, a second premolar, a first molar, and a canine, the essential artificial teeth include a canine artificial tooth (artificial canine), and, when the reference denture is placed on a plane assumed as an occlusal plane with the artificial teeth side facing downward, in a vertical cross-section cut on a surface along a normal direction with respect to the polished surface of the base anterior region, which is perpendicular to the plane and passes through a cusp tip of the artificial canine, the base anterior region on a lower side by 2 mm from a denture border side distal end of the base anterior region of the reference denture base have a width of 0.5 mm or more and 3 mm or less.

In addition, it is preferred that, in the reference denture according to the present invention, the reference denture be a maxillary reference denture, and in the vertical cross-section, the denture border side distal end of the base anterior region and the cusp tip of the artificial canine have a height difference of 13 mm or more and 20 mm or less.

In addition, it is preferred that, in the reference denture according to the present invention, the reference denture be a maxillary reference denture, and the base palatal plate portion have a minimum thickness of 0.5 mm or more and 3 mm or less.

In addition, it is preferred that, in the reference denture according to the present invention, the reference denture be a mandibular reference denture, and, in the vertical cross-section, the denture border side distal end of the base anterior region and the cusp tip of the artificial canine have a height difference of 13 mm or more and 18 mm or less.

According to a third aspect of the present invention, there is provided a production method for a denture, including: (A) a reference denture preparation step of preparing a reference denture serving as a reference denture member including a reference denture base member and artificial teeth; (B) a reference denture determination step of determining a shape of a reference denture to be used by (1) inserting the reference denture into an oral cavity of a patient so as to place the reference denture at an appropriate position on an imaginary occlusal plane assumed as an occlusal plane arranged at a position at which the occlusal plane is medically supposed to be present in the oral cavity of the patient, to thereby check a contact state between a mucosa in the oral cavity of the patient and the reference denture or (2) inserting the reference denture into an articulator having a patient oral cavity model attached thereto so as to place the reference denture at an appropriate position on an imaginary occlusal plane assumed as an occlusal plane arranged at a position at which the occlusal plane is medically supposed to be present in the oral cavity of the patient, to thereby check a contact state between the patient oral cavity model and the reference denture, selecting, in a case of an inappropriate contact in use, a reference denture having another shape that is prevented from causing the inappropriate contact or finely adjusting a shape of the reference denture base member in the reference denture so as to prevent the contact; (C) a building and transfer step of building a curable denture base material in an uncured state for forming the adjusting member on a mucosal surface of the reference denture base member in the reference denture determined to be used in the reference denture determination step, then placing the reference denture having the curable denture base material built thereon at an appropriate position on the imaginary occlusal plane in the oral cavity of the patient or the articulator, and transferring a mucosal shape of the oral cavity of the patient or a shape of the patient oral cavity model onto the curable denture base material and simultaneously forming a margin to remove the excess curable denture base material; and (D) a curing step of curing the curable denture base material that has undergone the building and transfer step. The building and transfer step (C) includes: (C1) a central building and transfer step of building the curable denture base material in an uncured state in a base central region of the reference denture base member and transferring the shape of the oral cavity of the patient or the shape of the patient oral cavity model; (C2) an anterior building and transfer step of building the curable denture base material in an uncured state in the base anterior region of the reference denture base member, and transferring the shape of the oral cavity of the patient or the shape of the patient oral cavity model and simultaneously extending the curable denture base material in an uncured state from a denture border to form a margin; and (C3) a posterior building and transfer step of building the curable denture base material in an uncured state in the base posterior region of the reference denture base member, and transferring the shape of the oral cavity of the patient or the shape of the patient oral cavity model and simultaneously extending the curable denture base material in an uncured state from a denture border to form a margin. After the central building and transfer step is performed, the anterior building and transfer step and the posterior building and transfer step are performed simultaneously or individually.

In addition, it is preferred that, in the production method for a denture according to the present invention, the reference denture be prepared in the reference denture preparation step and the denture be produced.

In addition, it is preferred that, in the production method for a denture according to the present invention, further include a wash step of adding the curable denture base material in an uncured state onto a surface on a mucosal surface side of the reference denture base to correct a shape of the surface on the mucosal surface side after completion of the anterior building and transfer step and the posterior building and transfer step.

Advantageous Effects of Invention

According to the present invention, the denture including a material member formed of a reference denture as a constituent member can be produced with higher total efficiency also including a preliminary check and adjustment by grinding without decreasing the fitting property to an individual patient.

In addition, the reference denture that can be used as a material member of a denture can significantly reduce the occurrence ratio of cases in which adjustment by grinding is determined to be required in a preliminary check.

In addition, in the production method for a denture, the above-mentioned denture can be efficiently produced.

BRIEF DESCRIPTION OF THE DRAWINGS

In FIG. 1(a) on the upper side and FIG. 1(b) on the lower side, there are illustrated "artificial canine vertical cross-sections" of a maxillary denture and a mandibular denture of a full denture (complete denture) type which is a canine-including form, respectively.

FIG. 6(a) is a plan view, FIG. 6(b) is a side view, and FIG. 6(c) is a rear view.

FIG. 10(a) on the left side is a view for illustrating a height difference between a denture border side distal end of a base anterior region and a maxillary canine cusp tip and a height difference between a highest point of a base palatal plate portion and the maxillary canine cusp tip in the "artificial canine vertical cross-section".

FIG. 11(a) on the left side is a view for illustrating a height difference between a denture border side distal end of a base anterior region and a mandibular canine cusp tip and a height difference between a denture border side distal end of a base lingual flange portion and the mandibular canine cusp tip in the "artificial canine vertical cross-section".

DETAILED DESCRIPTION

Figure 1A:
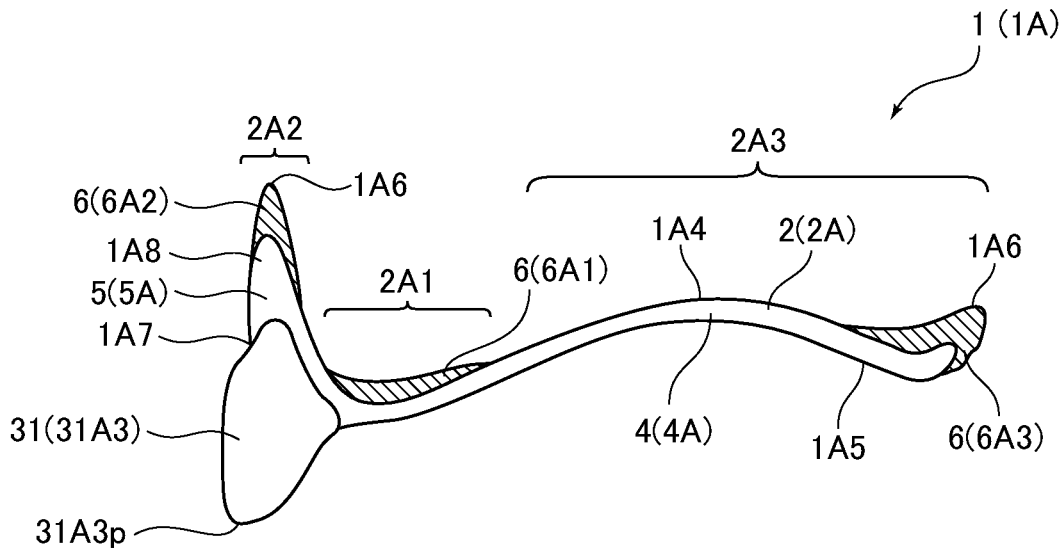
FIGS. 1(a) and (b) are each a cross-sectional view of a denture according to one embodiment of the present invention.

A denture of the present invention is a denture that is suitably produced by a production method for a denture of the present invention using a reference denture of the present invention as a material member, and has a novel structure which has not hitherto been known. The structure is also inevitably obtained by adopting such a production method for a denture of the present invention. In addition, one effect of the present invention is that the denture can be produced by the production method for a denture of the present invention. Then, as the effects of the production method for a denture of the present invention, there are mainly given the following advantageous points as compared to a customization method: "the occurrence frequency of cases in which adjustment by grinding is determined to be required in a preliminary check" is significantly reduced, which is not taken into consideration in the method disclosed in JP 6294706 B; and anyone can produce a highly accurate denture with satisfactory reproducibility regardless of the skill level of a producer.

First, the customization method to be compared regarding the above-mentioned effects and the method disclosed in JP 6294706 B are described, and then, the overview of the present invention is described. In addition, when specific description is given of the present invention, the features of a general denture and a general reference denture are first described in order to assist in understanding, and then, the denture, the reference denture, and the production method of the present invention are sequentially described.

[1. Current Production Method for Denture (Customization Method)]

A current production method for a denture (customization method) roughly includes the following steps 1 to 8.

[Current Denture Production Method (Customization Method) Procedure: Steps]
 1: Obtaining an impression in an oral cavity of a patient through use of an impression material.
 2: Producing a plaster model through use of the impression.
 3: Obtaining occlusion by allowing a patient to wear a occlusion plate.
 4: Producing a wax denture by arranging artificial teeth on the occlusion plate.
 5: Allowing the patient to try on the wax denture, and adjusting the occlusion.
 6: Producing a mold by embedding the wax denture in plaster.
 7: Producing a denture by injecting a resin into the mold and curing the resin.
 8: Finely adjusting the produced denture.

The above-mentioned step 8 generally includes the following three steps.
 8-1: Morphological correction
 8-2: Occlusion adjustment, and
 8-3: Inner surface adjustment as required The steps 1, 2, 3 and 5 are usually performed in a dental clinic, and the steps 4, 6 and 7 are usually performed in a dental laboratory. The step 8 is performed in both the dental clinic and the dental laboratory in most cases. The operations related to the steps 1 to 8 as described above require complicated and professional (skilled) techniques. In addition, an operator and a workplace vary, and hence the production period is usually long.

[2. Production Method for Denture in JP 6294706 B]

Here, in order to reduce the production time of a denture obtained through each step as described above, there are the above-mentioned technical contents disclosed in JP 6294706 B and WO 2018/207867 A1 regarding a denture using a denture base of a complete denture type in which the denture base is easily standardized.

The inventors of the present invention have made an attempt to produce a denture by a method using the jig described in WO 2018/207867 A1 through use of the reference denture described in JP 6294706 B. As a result, the inventors of the present invention have found that there is an advantage which has not hitherto been recognized, and at the same time, it became clear that there are issues (points required to be improved) which are not recognized in JP 6294706 B and WO 2018/207867 A1. First, the above-mentioned advantage is described. In the step of the customization method, the positions of arranged artificial teeth may be displaced due to the shrinkage of a resin serving as a plate material during curing, and hence it takes a relatively long period of time to perform occlusion adjustment in the step 8-2. In contrast, in the method of the present invention using a reference denture, such positional displacement of the artificial teeth does not occur, and hence the time required for occlusion adjustment can be significantly shortened.

Meanwhile, the points required to be improved are described. As described above, when a denture is produced through use of a reference denture, a simple preliminary check is generally performed, which involves inserting a maxillary reference denture and/or a mandibular reference denture into an oral cavity of a patient and checking a contact degree with a mucosa or the like. In the technology disclosed in JP 6294706 B, a check is performed through use of any one of the maxillary reference denture and the mandibular reference denture alone without particularly paying attention to an occlusal state. However, it has been found that, when a preliminary check is performed so as to maintain a satisfactory occlusal state, there are a relatively large number of cases in which adjustment by grinding is determined to be required. In such cases in which grinding is required, it is required to make preliminary adjustment by grinding using a handy grinder or the like, but such preliminary adjustment may lead to an increase in denture production time. Accordingly, as a first point to be improved, it is required to reduce the occurrence ratio of such cases.

A second point to be improved lies in that, when building of a liner and transfer of a mucosal surface are performed at a time, it is difficult to perform highly accurate transfer, and in addition, a variation may occur in a transfer state due to the difference in skill among operators, and the like. There is room for improvement of this point.

[3. Overview of Present Invention]

Under the above-mentioned circumstances, first, the present invention provides, as the denture of the present invention, a denture that can be produced while avoiding the occurrence of the problems as described above.

In addition, the reference denture of the present invention, specifically, the maxillary reference denture of the present invention and/or the mandibular reference denture of the present invention also serves as a material member forming a part of the above-mentioned denture of the present invention. The reference denture of the present invention can significantly reduce the occurrence ratio of cases in which adjustment by grinding is determined to be required in a preliminary check involving inserting the reference denture into an oral cavity of a patient or an articulator having the patient oral cavity model obtained in the step 2 of the customization method attached thereto.

In addition, the production method for a denture of the present invention enables a denture fitted to an individual patient to be efficiently produced by performing the building and transfer step to be performed in order to adapt a mucosal surface of a reference denture base member to an oral cavity mucosa of a patient in a plurality of separated stages. That is, according to the production method for a denture of the present invention, (1) adaptation of a mucosal surface of a central portion (base central region) of the reference denture base and (2) adaptation of a mucosal surface of each of an anterior portion (base anterior region) and a posterior portion (base posterior region) and formation and adaptation of a margin (denture border) are performed separately. With this, highly accurate transfer can be easily performed, and a variation in transfer state caused by the difference in skill among operators, and the like can be suppressed.

The feature of the production method of the present invention is described in more detail. In the production method of the present invention, through use of the reference denture of the present invention, the above-mentioned adjustment by grinding in the preliminary check can be made unrequired, or the grinding amount can be significantly reduced even when grinding is required.

Investigations made by the inventors of the present invention have clarified that the shape of the vicinity of a denture border of an anterior flange (sometimes called a "labial flange" or a "buccal flange" depending on the position) of each of a maxillary denture and a mandibular denture and the shape of the vicinity of a palatal portion denture border of the maxillary denture greatly varies depending on the individual. In the production method of the present invention, the number of adaptable patients is successfully increased through use of the reference denture of the present invention in which the adjustment allowance in each of those regions is increased.

When the shape and dimension of the reference denture are reduced as described above, the adjustment allowance is increased. As a result, when position adjustment using an adjusting member (specifically, position adjustment for achieving an ideal occlusal state at the time of wearing) is made in one stage, an increase in variation caused by the difference in skill is inevitable.

In contrast, in the production method of the present invention, rough positioning is performed by first adapting the mucosal surface of the base central region. Next, in a situation in which a fluctuation width is small, adaptation of the mucosal surfaces of the anterior portion (base anterior region) and the posterior portion (base posterior region), and formation and adaptation of the margin (denture border) are performed. With this, anyone can perform highly accurate positioning. In this case, the boundary with a mucosa of the patient can also be brought into a natural state by forming the margin while making up for (extending) the height of the anterior flange portion of the reference denture base and the length of the posterior portion of the reference denture base with a curable denture base material such as a liner.

For this reason, through adoption of the production method of the present invention, anyone (people other than physicians as well as physicians) can efficiently produce a denture fitted to an individual patient with satisfactory reproducibility and efficiency without requiring advanced training.

Now, the denture of the present invention is described after the general features of the denture and the reference denture serving as a main constituent member thereof are briefly described. Those general features, in particular, basic shapes, names of parts, materials, use methods, and the like also apply to the denture and the reference denture of the present invention.

[4. General Features of Denture]

A denture (plate denture) means a removable prosthetic appliance configured to restore oral functions such as mastication and prevent disorders caused by a facial morphological change, defects of teeth, and loss of surrounding tissue when natural teeth and surrounding tissue such as a gingiva and alveolar bone are lost. In the denture, a member configured to make up for defective (natural) teeth corresponds to artificial teeth, and a member configured to make up for lost surrounding tissue corresponds to a denture base. In this denture base, a surface that is brought into close contact with an alveolar ridge mucosa (surface that is not polished from the viewpoint of adaptability in production of a denture) is generally called a "mucosal surface" (or a basal surface), a surface that may be brought into contact with a buccal mucosa and the tongue on an opposite side (surface that is polished in production of a denture) is generally called a "polished surface", and a portion serving as the boundary between the above-mentioned surfaces is called a "denture border". In addition, a boundary portion between a portion corresponding to the gum of the denture base and the artificial teeth is called a "cervical line", and a portion forming a wing-like form having the cervical line as a proximal end and having the above-mentioned denture border as a distal end is called a "flange". In addition, a portion of the denture base to which artificial teeth are fixed is called an "alveolar portion".

In the present invention, following the above-mentioned names, the surface of the denture (plate denture) is divided into two surfaces: a surface in close contact with the alveolar ridge mucosa and a surface on the opposite side, and the former is referred to as "mucosal surface" and the latter is referred to as "polished surface".

The denture is classified into a maxillary denture for an upper jaw and a mandibular denture for a lower jaw. In each of the dentures, there are a full denture to be used when all the teeth become defective and a partial denture to be used when some of the teeth become defective. When the maxillary denture and the mandibular denture are compared to each other, the denture bases of both the dentures are common to each other in that both the denture bases each have portions called a "labial flange portion" and a "buccal flange portion", which are portions covering the alveolar ridge mucosae on the labial side and the buccal side (as used herein, the direction facing the labial side and the buccal side is defined as an "anterior side") in the oral cavity of the patient. However, due to the difference in function and shape of the upper jaw and the lower jaw, the shape of a portion covering a mucosa on the throat side (as used herein, the direction facing the throat side is defined as a "posterior side") in the oral cavity of the patient is significantly different. That is, the posterior portion of the maxillary denture base is a portion called a "palatal plate portion" covering a maxillary palatal mucosa, whereas the posterior portion of the mandibular denture base is a portion called a "lingual flange portion" covering a mandibular lingual alveolar ridge mucosa. The alveolar ridge is sandwiched between the lingual flange portion, and the labial flange portion and the buccal flange portion.

As an additional note about the anterior flange portion, the anterior flange portion is divided into three regions: left buccal flange portion, labial flange portion, and right buccal flange portion in accordance with the facing region thereof. The boundary thereof is not necessarily strictly defined, but the labial flange portion is defined to mean a region directed from the cervical line to the denture border in a central incisor, a lateral incisor, and a canine, and the left buccal (right buccal) flange is defined to mean a region directed from the cervical line to the denture border in a first premolar, a second premolar, a first molar, and a second molar on the left side (right side). However, the canine region may be included on the buccal side.

In addition, the anterior flange portion is a portion common to the maxillary denture base and the mandibular denture base, and the basic shape is the same. However, due to the difference in function and shape of the upper jaw and the lower jaw, the anterior flange portion slightly varies in shape. For example, on page 51 of "Dental Technician Textbook, Plate Denture Engineering, Full denture Engineering" (written by Yoshimichi Gonda et al.; Published in March 1994 (published by Ishiyaku Pub, Inc.), the standard height of an occlusal rim is described. According to the above-mentioned literature, the height of an occlusal rim for an upper jaw is 22 mm, and the height of an occlusal rim for a lower jaw is 18 mm. Thus, the height of the occlusal rim for the lower jaw is slightly lower.

As described above, in the denture, both the maxillary denture and the mandibular denture are each divided into two regions: an anterior portion and a posterior portion, and portion names (such portion names are also referred to as "two-divided names") are generally given. However, in the denture and the reference denture of the present invention, focus is given on a region of a mucosa in the oral cavity of the patient covered with the denture base, and the region is divided into three regions. Then, unique portion names (such names are sometimes referred to as "three-divided names") are given. That is, (1) a region (portion) having a mucosal surface covering a mucosa of an alveolar crest region in the oral cavity of the patient is defined as a "central region", (2) a region (portion) having a mucosal surface covering a mucosa in the oral cavity of the patient anterior to the above-mentioned alveolar crest region is defined as an "anterior region", and (3) a region (portion) having a mucosal surface covering a mucosa in the oral cavity of the patient posterior to the above-mentioned alveolar crest region is defined as a "posterior region".

The above-mentioned "central region" corresponds to a region including a partial region (included in the alveolar crest region) posterior to the "labial flange portion" and the "buccal flange portion" and a partial region (included in the alveolar crest region) anterior to the "palatal plate portion" or the "lingual flange portion) in the two-divided names. In addition, the "anterior region" corresponds to a main portion excluding a portion serving as the "central region" of each of the "labial flange portion" and the "buccal flange portion". In addition, the "posterior region" corresponds to a main portion excluding a portion serving as the "central region" of the "palatal plate portion" or the "lingual flange portion". For this reason (most of the portions are overlapped with each other although not completely matched with each other), the "posterior region" in each of the maxillary denture and the mandibular denture in the three-divided names is referred to as "palatal plate portion" and "lingual flange portion", respectively, in the same manner as in the two-divided names.

As a material for the above-mentioned denture base, the following resins are generally used. That is, for example: at least one poly(meth)acrylate-based resin selected from homopolymers of methyl (meth)acrylate, ethyl (meth)acrylate, isopropyl (meth)acrylate, n-propyl (meth)acrylate, and butyl (meth)acrylate, or copolymers thereof; polyolefin-based resin (e.g., polypropylene); polyamide-based resin (e.g., nylon 66(trademark)); polyester-based resins (e.g., polycarbonate); polyether-based resins (e.g., polyacetal and polysulfone); polynitrile-based resins (e.g., polyacrylonitrile); polyvinyl-based resins (e.g., polyvinyl acetate); cellulose-based resins (e.g., acetate cellulose); fluorine-based resins (e.g., polychlorofluoroethylene); and imide-based resins (e.g., aromatic polyimide) are used. Those resin materials are used as only the resin material itself in many cases, but a filler, such as an organic filler, an inorganic filler, or an organic-inorganic composite filler, may also be added and used. In addition, a metal material may be used for a part of the denture base.

For the artificial teeth to be arranged and fixed to the above-mentioned denture base, the kind and number of the artificial teeth to be arrayed are appropriately determined in accordance with a target denture. The number may be one, but a plurality of artificial teeth are usually fixed. As such artificial teeth, publicly known artificial teeth made of a resin or ceramics may be used. Examples of the artificial tooth made of a resin include artificial teeth each containing as a material, for example, the above-mentioned poly(meth)acrylate-based resin, a polyolefin-based resin, a polyamide-based resin, a polyester-based resin, a polyether-based resin, a polynitrile-based resin, a polyvinyl-based resin, a cellulose-based resin, a fluorine-based resin, an imide-based resin, or a silicone-based resin. As a method of fixing the artificial tooth, a method known in the art, such as fitting and adhesion, may be used without any limitation.

[5. General Features of Reference Denture]

A reference denture means a ready-made denture-like member to be used as a material member for facilitating the production of a denture, and more specifically, a denture-like member in which the shape and dimension are standardized in a predetermined manner and which can be mass-produced in a factory, a dental laboratory, or the like as a product for a member that satisfies predetermined specifications. The term "ready-made" as used herein means that the product is available as a component product.

The reference denture includes a reference denture base and artificial teeth that are fixed and held on the reference denture base. When a denture is produced through use of the reference denture as a member, an artificial teeth portion of the reference denture serves as an artificial teeth portion of the denture, and the denture base (reference denture base) of the reference denture forms a main portion of a denture base of the denture. That is, the reference denture base serves as a base of the denture. When the reference denture base is compared to a final form (shape) of the above-mentioned denture base of the denture, a curable denture base material such as a liner is filled into a space or a gap (the space or the gap is hereinafter sometimes referred to as "reference denture unfitted space") formed between a mucosal surface of the reference denture base and a mucosa in the oral cavity of an individual patient (that is a wearer), and the mucosal surface and the mucosa are fitted to each other. Then, although the reference denture is smaller than the denture by the reference denture unfitted space that can also be called an "adjustment allowance", the basic structure and shape of the reference denture are the same as those of the denture. Accordingly, in the present invention, the reference denture is regarded as a denture, and the mucosal surface, the polished surface, and the denture border are defined. In addition, respective regions (portions) of the reference denture are referred to as "base central region", "base anterior region", and "base posterior region", respectively, pursuant to the "central region", the "anterior region", and the "posterior region" which are the three-divided names of the corresponding regions (portions) of the denture.

That is, the reference denture includes a reference denture base and artificial teeth, the reference denture base includes the "base central region", the "base anterior region", and the "base posterior region", and the above-mentioned artificial teeth are fixed on the polished surface side of a region from the "base central region" to the "base anterior region". The reference denture base and artificial teeth in the reference denture are not particularly different from the denture base and artificial teeth in the denture except that the shape of the reference denture base is as described above.

The reference denture base may be produced through use of various procedures, such as injection molding, compression molding, cutting, and stereolithography using a three-dimensional printer. In addition, the reference denture base and the artificial teeth (dentition) may be integrally produced. Alternatively, after the reference denture base and the artificial teeth (dentition) are separately produced, the artificial teeth (dentition) may be attached to an alveolar portion of the reference denture base. The former has the advantage in that the reference denture base can be easily mass-produced by mass production, and the production cost can be significantly reduced. The latter has the advantage in that artificial teeth (dentition) fitted to an individual patient can be formed.

In addition, in the reference denture, a large number of variations in tooth arrangement and the like are not required as a ready-made reference denture, and a reference denture which is different only in relative dimension (size) is prepared in most cases. In addition, a reference denture for a full denture (complete denture) in which all the dentitions are fixed is used in many cases.

The reference denture is generally designed in such a shape that a planar shape of the reference denture base is adapted to a large number of patients (serving as, so to speak, a common part as in a greatest common divisor) based on a large amount of clinical data and data on a large number of oral cavity shapes of a dentulous person and an edentulous person (see JP 6294706 B). However, there are no examples in which the three-dimensional shape of the reference denture is optimized or specified in consideration of the usage amount of a curable denture base material such as a liner, the frequency at which adjustment by grinding is determined to be required in a preliminary check, and the strength of the reference denture as far as the inventors of the present invention know.

[6. Denture According to One Embodiment of Present Invention]

Figure 1B:
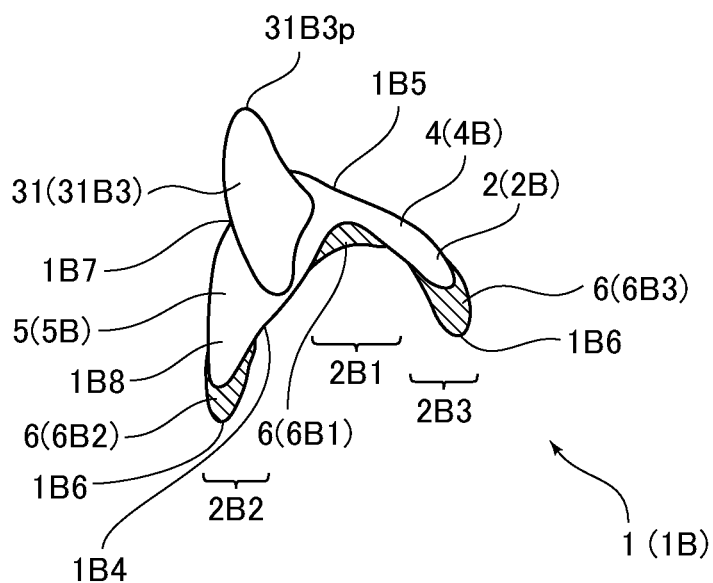
Figure 2:
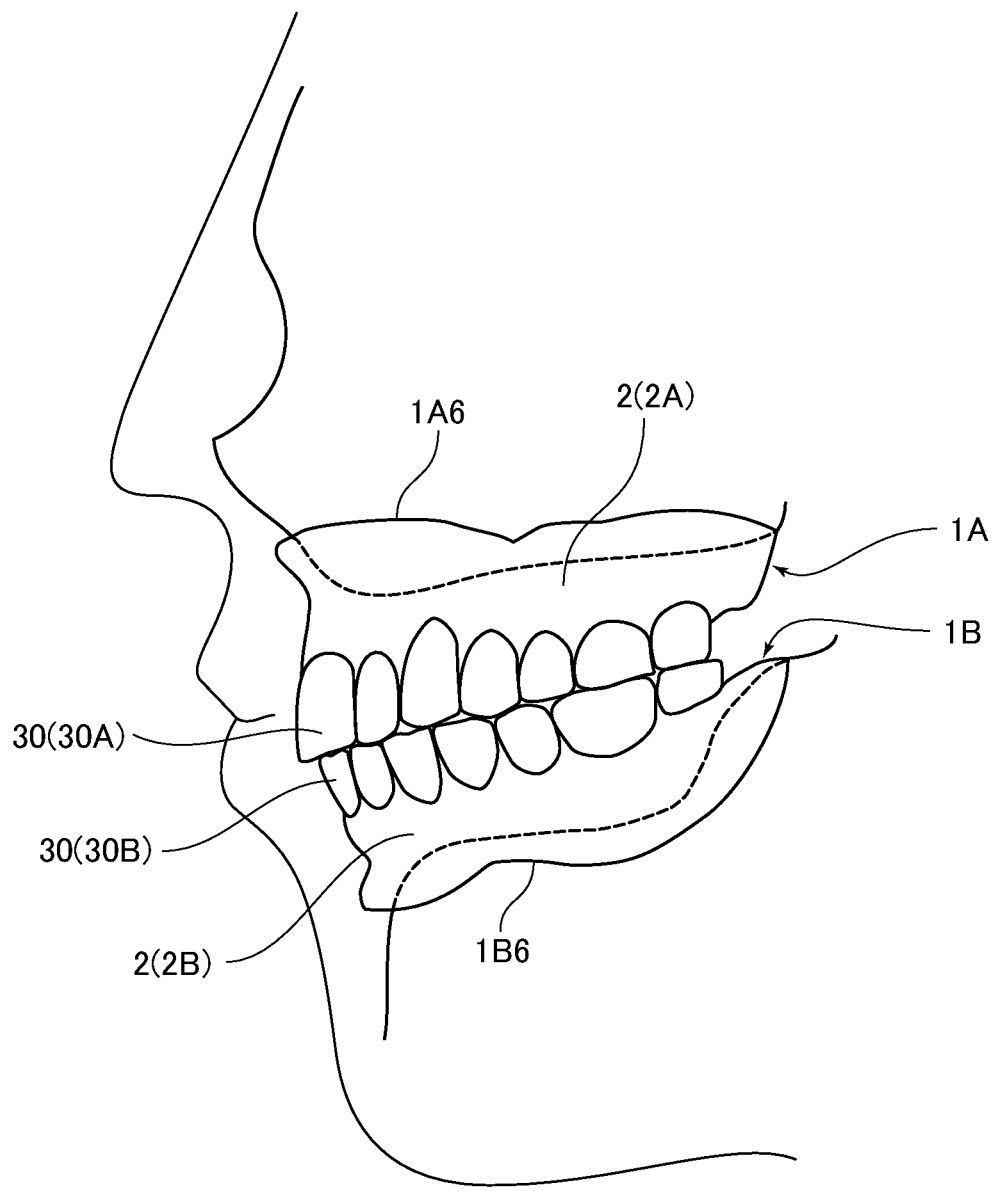
FIG. 2 is a view for illustrating an image in which the maxillary denture and the mandibular denture according to the one embodiment of the present invention are worn by a patient.

Now, a denture 1 according to one embodiment of the present invention of a full denture (complete denture) type is described with reference to FIG. 1 and FIG. 2. As illustrated in FIGS. 1(*a*), 1(*b*) and 2, the denture 1 (1A and 1B) has a basic structure in which artificial teeth 31 (31A and 31B) or an artificial dentition 30 (30A and 30B) is fixed to a denture base 2 (2A and 2B) in the same manner as in a general denture.

In addition, in the same manner as in a general denture produced through use of a reference denture, the denture 1 includes a reference denture member 5 (5A and 5B) having the artificial teeth 31 (31A and 31B) fixed to a reference denture base member 4 (4A and 4B) and an adjusting member 6 formed of a cured body of a curable denture base material. Then, the denture base 2 (2A and 2B) includes the reference denture base member 4 (4A and 4B) and the adjusting member 6 joined to the reference denture base member 4 (4A and 4B). The reference denture base member 4 (4A and 4B) serves as a base forming a main portion of the denture base 2 (2A and 2B), and in the configuration illustrated in FIGS. 1(*a*), 1(*b*) and 2, the adjusting member 6 forms a remaining portion of the denture base 2.

Further, the denture base 2 (2A and 2B) in this embodiment includes "central regions" 2A1 and 2B1, "anterior regions" 2A2 and 2B2, and "posterior regions" 2A3 and 2B3 in the three-divided names in the same manner as in a related-art general denture. Then, the reference denture base member 4 (4A and 4B) includes "base central regions" 20A1 and 20B1, "base anterior regions" 20A2 and 20B2, and "base posterior regions" 20A3 and 20B3, respectively, in the same manner as in a related-art general reference denture base, corresponding the above-mentioned respective regions. Regarding the numbers (reference symbols) of the respective portions of the reference denture base member 4 (4A and 4B), the same numbers (reference symbols) as those of a reference denture 10 (see FIG. 3 and FIG. 4) according to this embodiment which includes the reference denture base member 4 as a reference denture base and which is used as the reference denture member 5 are used.

The denture 1 according to this embodiment has a great feature in that, in all the above-mentioned regions, the reference denture base member 4 (4A and 4B) forms a main portion of the denture base 2 (2A and 2B), and the reference denture base member 4 is joined to the adjusting member 6 in a specific manner.

Specifically, the adjusting member 6 has a first feature in the following. The adjusting member 6 constitutes the remaining portion of the central region 2A1, 2B1 except the reference denture base members 4 (4A, 4B), and includes the central adjusting members 6A1 and 6B1 joined to mucosal surfaces 23A and 23B of the base central regions 20A1 and 20B1. In addition, the adjusting member 6 constitutes the remaining portion of the anterior regions 2A2 and 2B2 except the reference denture base members 4 (4A, 4B), and includes the anterior adjusting members 6A2 and 6B2 joined to the mucosal surfaces 23A and 23B of the base anterior regions 20A2 and 20B2. In addition, the adjusting member 6 constitutes the remaining portion of the posterior regions 2A3 and 2B3 except the reference denture base member 4 (4A and 4B), and includes posterior adjusting members 6A3 and 6B3 joined to the mucosal surfaces 23A and 23B of the base posterior regions 20A3 and 20B3. Thus, at least parts of mucosal surfaces 1A4 and 1B4 in the central regions 2A1 and 2B1, the anterior regions 2A2 and 2B2, and the posterior regions 2A3 and 2B3 are formed of the central adjusting members 6A1 and 6B1, the anterior adjusting members 6A2 and 6B2, and the posterior adjusting members 6A3 and 6B3, respectively.

Further, the adjusting member 6 has a second feature in the following. At least parts of distal end regions on the side of denture borders 1A6 and 1B6 in the anterior regions 2A2 and 2B2 and the posterior regions 2A3 and 2B3 are formed of the anterior adjusting members 6A2 and 6B2 and the posterior adjusting members 6A3 and 6B3, respectively.

The central adjusting member 6A1 (6B1), the anterior adjusting member 6A2 (6B2), and the posterior adjusting member 6A3 (6B3) are not always required to be present independently, but may be formed so as to be connected to each other to cover an entire surface of the mucosal surface of the reference denture base member 4A (4B).

Usually, in the denture 1 (1A, 1B) according to this embodiment, the reference denture base member 4 (4A, 4B) has a standardized predetermined shape (predetermined shape to be mass-produced) or a shape that is substantially the same as the above-mentioned shape. Here, the phrase "shape that is substantially the same" means a shape that is slightly changed from a predetermined shape through fine adjustment by simple grinding or the like. Further, the adjusting member 6 has a shape adjusted in conformity with the shape of an oral cavity of a patient so that, under a state in which the denture is worn in an oral cavity of an individual patient to be a wearer, an "occlusal plane" obtained by approximating an "occlusal surface" that is a curved surface on which teeth of an upper jaw and a lower jaw (here, the teeth mean artificial teeth fixed to the denture, and natural teeth when the patient has the natural teeth) are brought into close contact with each other is placed at a position at which the occlusal plane is medically supposed to be present in the oral cavity of the patient.

Since the denture 1 (1A and 1B) according to this embodiment has the above-mentioned structure, the denture 1 has a fitting property comparable to that of a denture obtained by the customization method, and the denture 1 can be easily produced in a short period time by adopting the production method according to this embodiment.

The curable denture base material that serves as a material for a cured body forming the adjusting member 6 in the denture 1 (1A and 1B) according to this embodiment means a polymerization curable material, which becomes a material for the above-mentioned resin denture base by being cured. The curable denture base material contains a monomer (polymerizable monomer) serving as a raw material for the above-mentioned resin material, a polymerization initiator, and a filler as required, and is a material which can be plastically deformed in the form of a paste or rice cake before being cured and can retain the form thereof when stress is not applied thereto. The polymerization type of the curable denture base material includes a photopolymerization type, a thermal polymerization type, a chemical polymerization type, a microwave polymerization type, and the like depending on the kind of a polymerization initiator to be used, but from the viewpoint of operability, the photopolymerization type is preferred.

Figure 7:
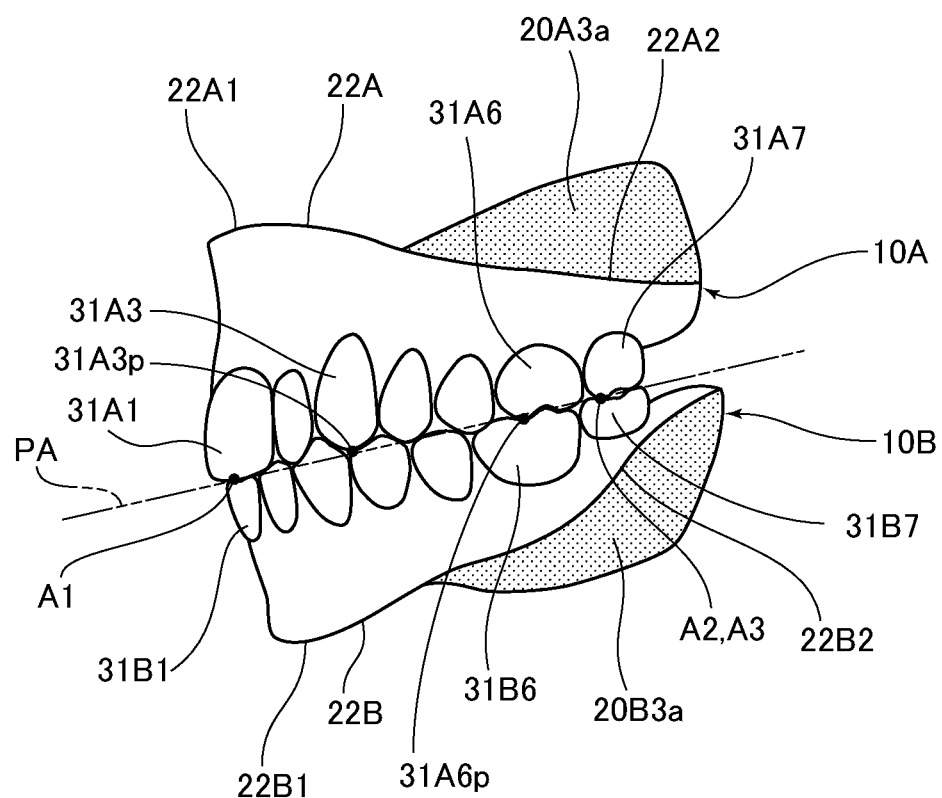
FIG. 7 is a view for illustrating a state in which the maxillary reference denture and the mandibular reference denture according to the one embodiment of the present invention are respectively occluded.
Figures 10A, 10B:
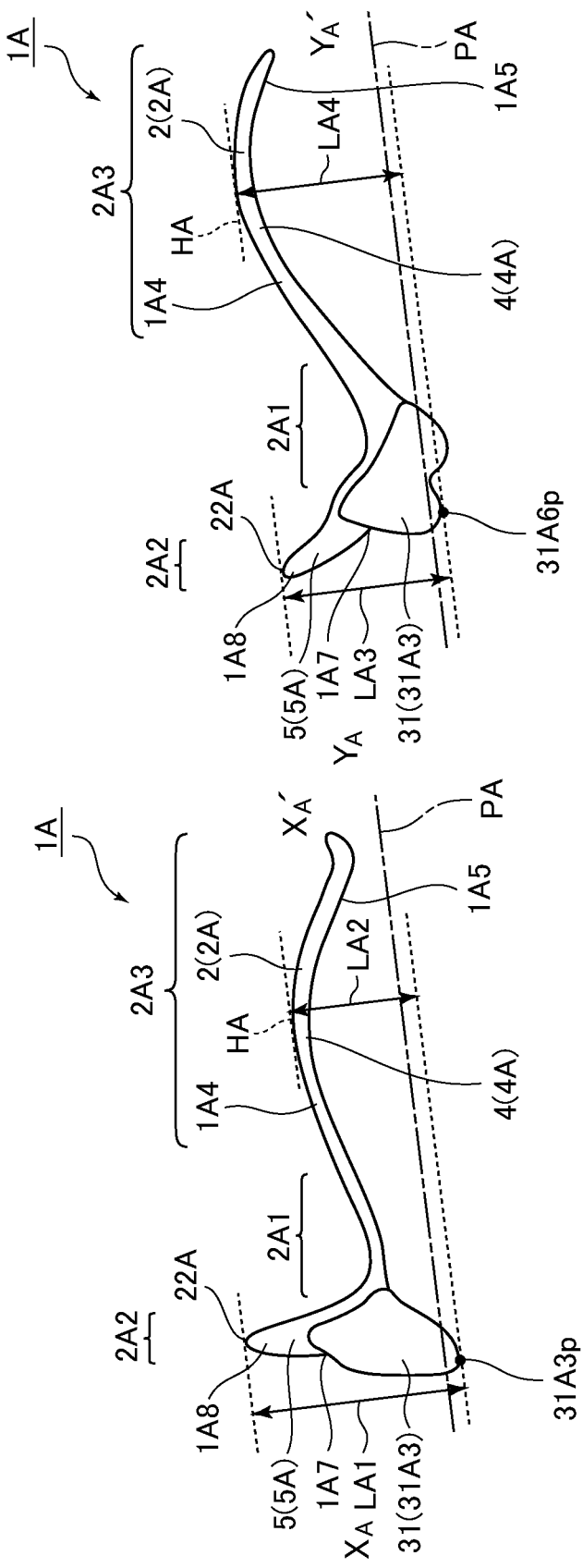
FIGS. 10(a) and (b) are each a schematic view for illustrating a preferred three-dimensional shape of the maxillary denture of a full denture (complete denture) type which is a canine and first molar-including form according to the one embodiment of the present invention.
FIG. 10(b) on the right side is a view for illustrating a height difference between a denture border side distal end of a base anterior region and a maxillary first molar mesiobuccal cusp tip and a height difference between a highest point of a base palatal plate portion and the first molar mesiobuccal cusp tip in the "artificial first molar vertical cross-section".
Figure 11A:
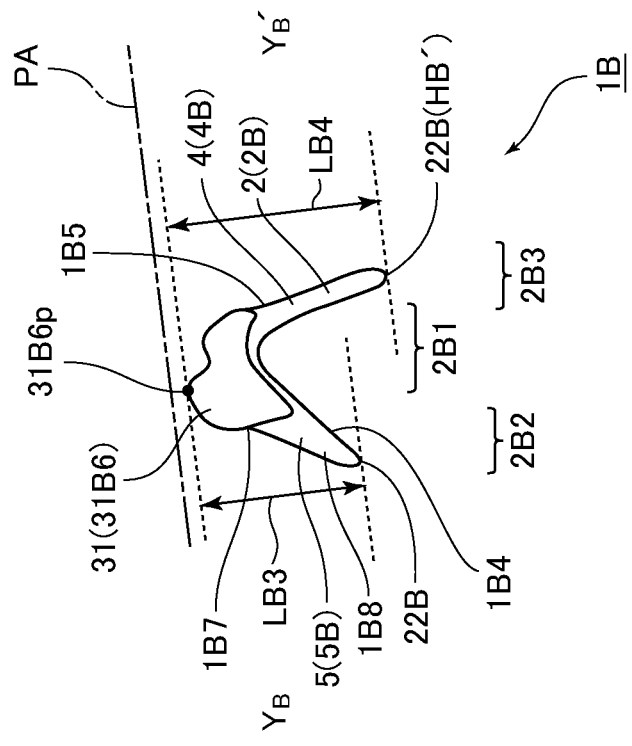
FIGS. 11(a) and (b) are schematic views for illustrating a preferred three-dimensional shape of the mandibular denture of a full denture (complete denture) type which is a canine and first molar-including form according to the one embodiment of the present invention.

In view of the degree of the effect, the denture according to this embodiment is preferably a denture in which the above-mentioned artificial teeth are one or a plurality of artificial teeth including, as an essential artificial tooth, an artificial tooth of at least one tooth selected from the group consisting of a first premolar, a second premolar, a first molar, and a canine, in particular, a denture having a form in which the three or more artificial teeth 31 (31A and 31B) including artificial canines 31A3 and 31B3 (see FIG. 7, FIGS. 10(a) and (b), and FIGS. 11(a) and (b)) are fixed individually and/or in a coupled state (hereinafter sometimes referred to as "canine-including form"), more preferably a denture having a form in which the three or more artificial teeth 31 (31A and 31B) including an artificial canine and first molars 31A6 and 31B6 are fixed (hereinafter sometimes referred to as "canine and first molar-including form"), particularly preferably a full denture (complete denture).

Then, when a boundary portion of the anterior polished surface of the above-mentioned denture base with the artificial tooth is defined as a "cervical line", a portion forming a wing-like form from the cervical line to the denture border is defined as a "flange", and a portion on an anterior side of the flange having the cervical line of the essential artificial tooth as a proximal end and having the denture border on an extension of the cervical line as a distal end is defined as an "essential artificial tooth anterior flange portion", it is preferred that, when there is one essential artificial tooth, a denture border portion of the essential artificial tooth anterior flange portion in the artificial tooth be formed of the anterior adjusting member, when there are a plurality of essential artificial teeth, a denture border portion of the essential artificial tooth anterior flange portion in at least one of the plurality of essential artificial teeth be formed of the anterior adjusting member, and 5% or more and 65% or less (hereinafter "x or more and y or less" may be sometimes simply expressed as "x to y") of the polished surface of the essential artificial tooth anterior flange portion be formed of the anterior adjusting member.

In the above-mentioned canine-including form, portions having, as proximal ends, cervical lines 1A7 and 1B7 in parts on anterior polished surfaces 1A5 and 1B5 in which artificial canines are present and having, as distal ends, the denture borders 1A6 and 1B6 on an extension of the cervical lines are defined as "essential artificial tooth anterior flange portions". In the above-mentioned canine-including form, when the "essential artificial tooth anterior flange portions" for the artificial canines are defined as "canine anterior flange portions", it is preferred that at least parts of the denture borders of the canine anterior flange portions be formed of the anterior adjusting members 6A2 and 6B2, and further, 5% or more and 65% or less of the polished surfaces of the "canine anterior flange portions" be formed of the anterior adjusting members 6A2 and 6B2. In addition, in the above-mentioned canine and molar-including form, portions having the cervical lines 1A7 and 1B7 of the artificial first molars 31A6 and 31B6 on the anterior polished surfaces 1A5 and 1B5 as proximal ends and having the denture borders 1A6 and 1B6 on an extension of the cervical lines as distal ends are defined as "essential artificial tooth anterior flange portions" of the artificial first molars. In the canine and molar-including form, when the "essential artificial tooth anterior flange portions" for the artificial first molars are defined as "first molar anterior flange portions", it is preferred that preferred conditions in the above-mentioned canine-including form be satisfied, the denture borders of most posterior molar anterior flange portions be formed of the anterior adjusting members 6A2 and 6B2, and further, 5% or more and 65% or less of the polished surfaces of the "first molar anterior flange portions" be formed of the anterior adjusting members 6A2 and 6B2.

The features common to the maxillary and mandibular dentures 1 (1A and 1B) in this embodiment have been described. However, as described above, there are different points between the maxillary denture and the mandibular denture, and those differences are reflected also on the denture according to this embodiment. That is, in the denture 1A according to this embodiment for an upper jaw, the denture base 2 includes, as the above-mentioned posterior region, the maxillary denture base 2A which is a palatal plate portion 2A3 covering a maxillary palatal mucosa of a patient. In addition, the reference denture member is the maxillary reference denture member 5A in which the artificial teeth 31A are fixed to the maxillary reference denture base 4A including, as the above-mentioned base posterior region, a base palatal plate portion 20A3 forming a main portion of the palatal plate portion 2A3. Further, the palatal plate portion 2A3 includes a palatal plate adjusting portion 6A3 formed of the posterior adjusting member.

In addition, in the denture 1A according to this embodiment for an upper jaw, which has a canine-including form, it is preferred that at least a part of the denture border of the "canine anterior flange portion" be formed of the anterior adjusting member 6A2, and 10% to 65%, particularly 10% to 60% or less of the polished surface of the canine anterior flange portion be formed of an exposed surface of the anterior adjusting member 6A2.

Meanwhile, in the denture 1B according to this embodiment for a lower jaw, the denture base 2 includes, as the above-mentioned posterior region, the mandibular denture base 2B which is a lingual flange portion 2B3 covering a lingual alveolar ridge mucosal surface of a patient.

In addition, the reference denture member 5 is the mandibular reference denture member 5B in which the artificial teeth 31B are fixed to the mandibular reference denture base 4B including, as the above-mentioned base posterior region, a base lingual flange portion 20B3 forming a main portion of the lingual flange portion 2B3. In addition, the lingual flange portion 2B3 includes a lingual flange adjusting portion 6B3 formed of the posterior adjusting member.

In addition, in the denture 1B according to this embodiment for a lower jaw, which has a canine-including form, it is preferred that at least a part of the denture border of the "canine anterior flange portion" be formed of the anterior adjusting member 6B2, and 5% to 60%, particularly 10% to 60% or less of the canine anterior flange portion be formed of an exposed surface of the anterior adjusting member 6B2.

Here, as illustrated in FIG. 1(*a*), in the mucosal surfaces of the maxillary reference denture base 4A (maxillary reference denture member 5A), the curvature radius of the mucosal surface on which the central adjusting member 6A1 is arranged is smaller than those of the mucosal surfaces on which the anterior adjusting member 6A2 and the palatal plate adjusting portion 6A3 are arranged. The curvature radius of a part on which the central adjusting member 6A1 is arranged is small, and hence positioning at the time of forming the anterior adjusting member 6A2 and the palatal plate adjusting portion 6A3 is facilitated. Meanwhile, due to the small curvature radius, in the case in which adaptation with the mucosal surface of the oral cavity of the patient is performed by filling a curable denture base material into the above-mentioned reference denture unfitted space, when an attempt is made to perform this adaptation only by one operation, mere application of a slight force is liable to cause the front and back of a portion having the force applied thereto to wobble upward and downward with the portion as a fulcrum, and a high-level technique is required in order to perform highly accurate adaptation. However, through adoption of the production method of the present invention, the occurrence of such wobbling can be suppressed while the advantage of the above-mentioned ease of positioning is obtained.

In addition, as illustrated in FIG. 1(*b*), in the mucosal surfaces of the mandibular reference denture base 4B (mandibular reference denture member 5B), the curvature radius of the mucosal surface on which the central adjusting member 6B1 is arranged is smaller than those of the mucosal surfaces on which the anterior adjusting member 6B2 and the lingual flange adjusting portion 6B3 are arranged. Then, the mandibular reference denture base 4B is the same as the maxillary reference denture base 4A in the following points: the curvature radius of a part on which the central adjusting member 6B1 is arranged is small, and hence positioning at the time of forming the anterior adjusting member 6B2 and the lingual flange adjusting portion 6B3 is facilitated; and through adoption of the production method of the present invention, the occurrence of wobbling can be suppressed.

Figure 12:
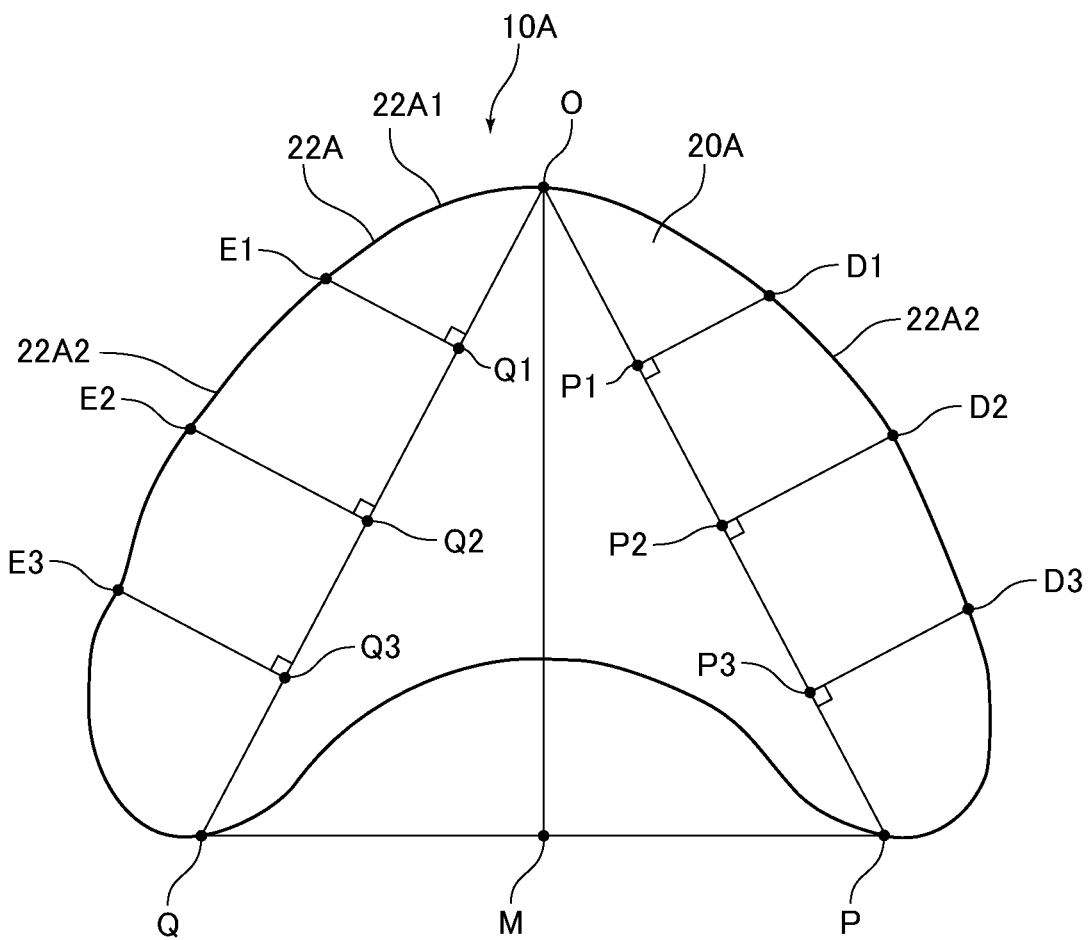
FIG. 12 is a view for illustrating the shape of the maxillary reference denture according to the one embodiment of the present invention in plan view and illustrating the length of each portion defining a preferred planar shape based on the length of a line segment PQ.

In the maxillary reference denture base 4A (maxillary reference denture member 5A), the central region 2A1 is positioned in the vicinity of the artificial tooth 31. Therefore, as is clear from the planar shape (see FIG. 12) of a maxillary reference denture 10A described later, the central region 2A1 has a bow shape (U shape). Then, through arrangement of a curable denture base material serving as at least a part of the central adjusting member 6A1 in at least three parts: a central portion of a curved portion of the central region 2A1 having a bow shape and the other parts (including the vicinity of both ends), usually over an entire region, even in a stage in which the curable denture base material serving as at least a part of the anterior adjusting member 6A2 and the palatal plate adjusting portion 6A3 has not been arranged, positioning with respect to the shape of the oral cavity of the patient is performed.

[7. Reference Denture According to One Embodiment of Present Invention]

The reference denture according to the one embodiment of the present invention is a reference denture used as the above-mentioned reference denture member in the denture according to the one embodiment of the present invention.

Figure 3:
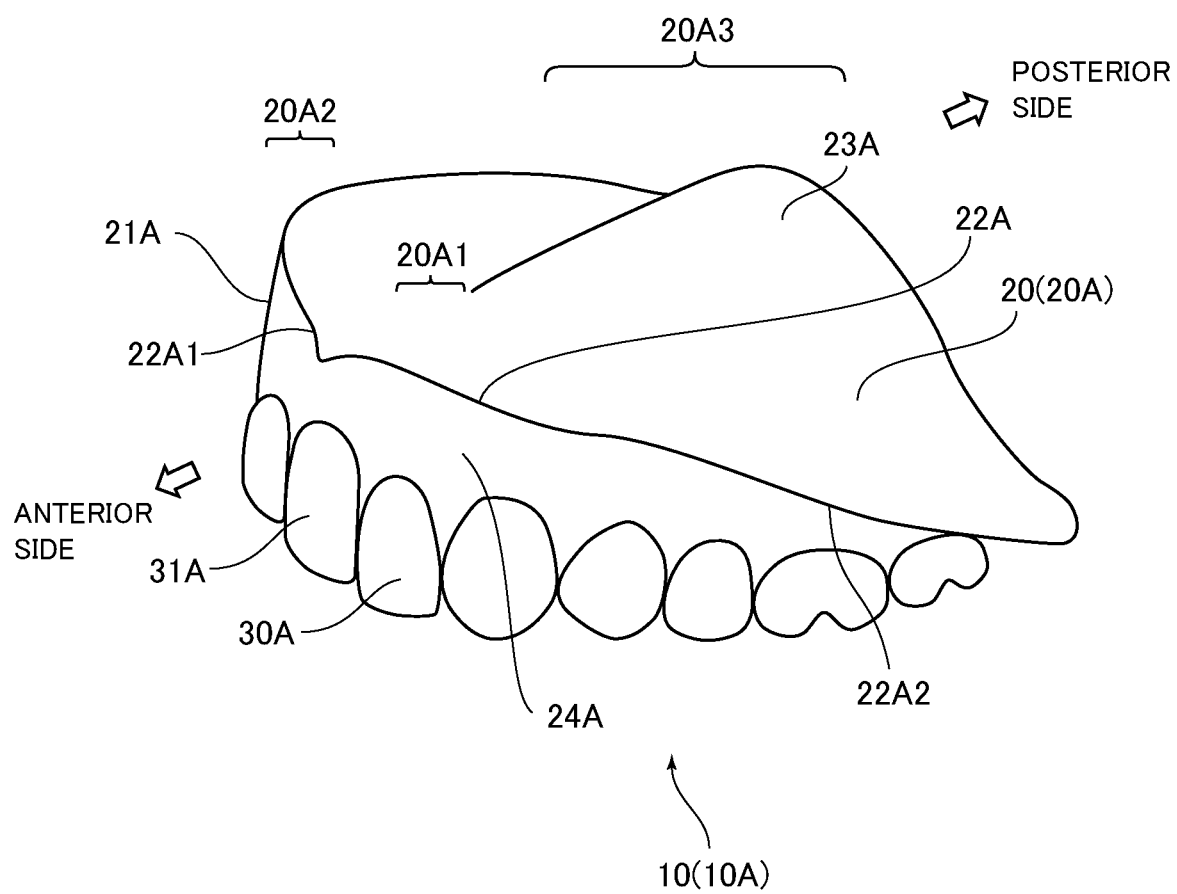
FIG. 3 is a perspective view for illustrating a maxillary reference denture according to the one embodiment of the present invention.
Figure 4:
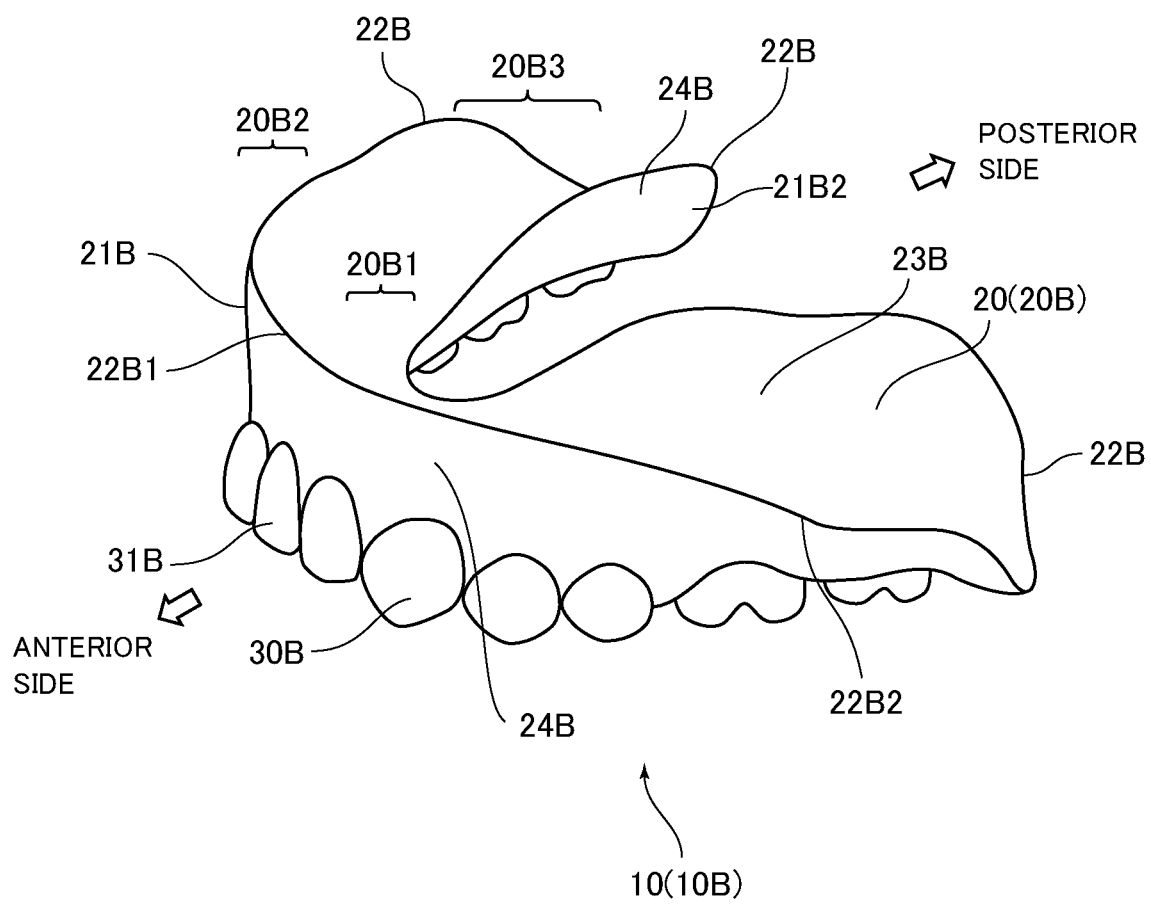
FIG. 4 is a perspective view for illustrating a mandibular reference denture according to the one embodiment of the present invention.

With reference to FIG. 3 and FIG. 4, the reference denture 10 (10A and 10B) according to this embodiment that can be suitably used as the reference denture member 5 of the denture according to this embodiment is described. The reference denture 10 (10A and 10B) has a basic structure in which the artificial teeth 31 or the artificial dentition 30 is fixed to a reference denture base 20 in the same manner as in the related-art general reference denture. The reference denture base 20 includes the "base central regions" 20A1 and 20B1, the "base anterior regions" 20A2 and 20B2, and the "base posterior regions" 20A3 and 20B3 corresponding to the "central regions" 2A1 and 2B1, the "anterior regions" 2A2 and 2B2, and the "posterior regions" 2A3 and 2B3 in the denture base 2 of the denture 1. Also in the reference denture 10, the portion names, such as denture borders 22A and 22B (labial flange borders 22A1 and 22B1 and buccal flange borders 22A2 and 22B2), the mucosal surfaces 23A and 23B, polished surfaces 24A and 24B, and the cervical line have the same meanings as those of the related-art denture and the related-art reference denture.

Regarding the planar shape of the reference denture including the reference denture according to this embodiment, even in the related-art reference denture, the planar shape of the reference denture is optimized so as to be adapted to a large number of patients based on a large amount of clinical data and data on a large number of oral cavity shapes of a dentulous person and an edentulous person (see JP 6294706 B). Then, a reference denture having an appropriate size is also selected to be used as a material member of the denture for a patient in accordance with the dimension of the oral cavity of the patient.

Here, regarding the three-dimensional shape of the reference denture, there is a basic design concept that, in the related-art reference denture, the above-mentioned "reference denture unfitted space" which is an adjustment allowance by a curable denture base material is secured. However, as a specific method of securing the "reference denture unfitted space", the thickness of the reference denture base is generally reduced uniformly (see JP 3449733 B), and the reference denture is not optimized as intended.

In contrast, in the reference denture according to this embodiment, the three-dimensional shape of the reference denture is defined in consideration of the width of the adaptable range of the reference denture (in other words, the lowness of the frequency at which adjustment by grinding is determined to be required in the preliminary check), the ease of adjusting the mucosal surface through use of a curable denture base material, the usage amount of the curable denture base material in this case, the strength of the reference denture, and the like. That is, when the shape of the denture base 2 is defined as a basic shape, the thickness of at least a part of each region of the base central region, the base anterior region and the base posterior region is set to be significantly smaller than the thickness of each of the central region, the anterior region, and the posterior region, and in addition, the height of the denture border of the base anterior region is set to be significantly lower than that of the related-art reference denture. Thus, spaces in which the central adjusting members 6A1 and 6B1, the anterior adjusting members 6A2 and 6B2, and the posterior adjusting members 6A3 and 6B3 can be joined are secured.

Now, the planar shape and the three-dimensional shape of the reference denture of the present invention are described below in more detail.

(7-1. With Regard to Preferred Planar Shape)

Figure 13:
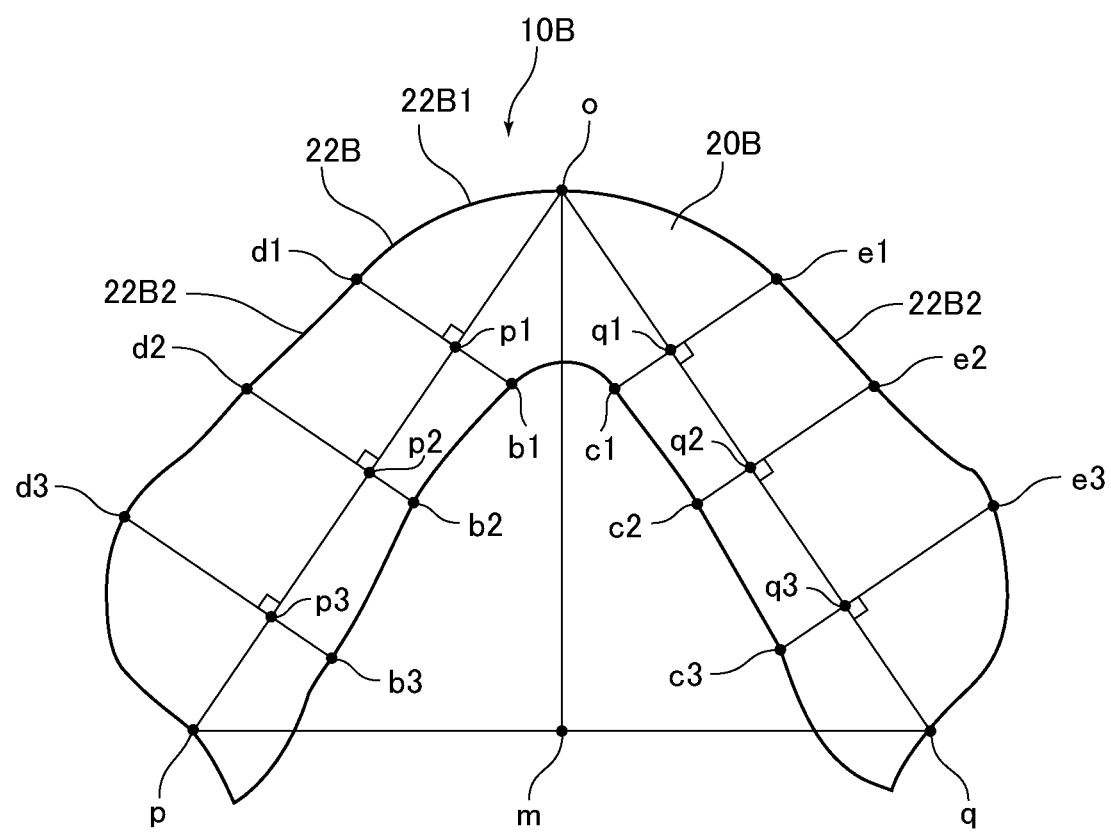
FIG. 13 is a view for illustrating the shape of the mandibular reference denture according to the one embodiment of the present invention in plan view and illustrating the length of each portion defining a preferred planar shape based on the length of a line segment pq.

It is preferred that the planar shape of the reference denture of the present invention be a planar shape as described in JP 6294706 B. Now, such a planar shape is described with reference to FIG. 12 and FIG. 13. The preferred planar shape means a shape obtained as follows. A point corresponding to a left pterygomaxillary notch on a plate posterior edge regarding the maxillary reference denture, and a point corresponding to a left retromolar pad on a plate posterior edge regarding the mandibular reference denture are defined as first reference points: P (p) for an upper jaw (lower jaw), respectively. In addition, similarly, a point corresponding to a right pterygomaxillary notch of the maxillary reference denture, and a point corresponding to a right retromolar pad of the mandibular reference denture are defined as second reference points: Q (q) for an upper jaw (lower jaw), respectively. Further, points corresponding to frenulum of upper (lower) lip, which correspond to the midline portion of the labial flange border, are defined as third reference points: O (o) for an upper jaw (lower jaw), respectively. The length of a line segment: PQ (pq) connecting P (p) and Q (q) is defined as a reference length, and the lengths from a plurality of points defined at predetermined positions on two reference line segments OP (op) and OQ (oq) connecting the third reference point to the first reference point and the second reference point, respectively, to the denture border, and the length of a line segment OM (om) when a midpoint of the line segment PQ (pq) is represented by M (m) are set so that ratios of the lengths to the above-mentioned reference length fall within predetermined ranges. The above-mentioned reference points and plurality of points are not necessarily present on the same plane. However, the height difference with respect to the length of each line segment defining the shape is small, and hence the reference points and plurality of points are regarded to be present on a planar shape in this description.

Now, the above-mentioned plurality of points and the length from each of the points to the denture border (relative length standardized with the reference length) are described regarding each of the maxillary reference denture and the mandibular reference denture.

(1) With Regard to Maxillary Reference Denture

Respective points of the maxillary reference denture mean three points (P1, P2, and P3 from the anterior side to the posterior side) which are present on the line segment OP and which equally divide the line segment OP into four parts, and three points (points Q1, Q2, and Q3 from the anterior side to the posterior side) which are present on the line segment OQ and which equally divide the line segment OQ into four parts. Then, points (D1, D2, and D3 as points corresponding to P1, P2, and P3, and E1, E2, and E3 as points corresponding to Q1, Q2, and Q3) where perpendicular lines intersect the anterior denture border when perpendicular lines to the line segment OP or the line segment OQ on which the respective points are present are drawn, are determined. The length from each of the points to the denture border means a line segment connecting corresponding points, that is, the relative length of each of a line segment P1D1, a line segment P2D2, a line segment P3D3, and a line segment Q1E1, a line segment Q2E2, and a line segment Q3E3 with respect to the line segment PQ.

The preferred planar shape of the maxillary denture base is a shape in which the length of the line segment OM is from 0.76 to 0.98, the length of each of P1D1 and the line segment Q1E1 is from 0.11 to 0.36, the length of each of the line segment P2D2 and the line segment Q2E2 is from 0.19 to 0.45, and the length of each of the line segment P3D3 and the line segment Q3E3 is from 0.16 to 0.45.

(2) With Regard to Mandibular Reference Denture

Respective points of the mandibular reference denture are points p1, p2, p3, q1, q2, q3, and m corresponding to the points P1, P2, P3, Q1, Q2, Q3, and M, which are the respective points for an upper jaw. In addition, the length from each of the points to the denture border includes not only the length to the anterior denture border but also the length obtained by adding the length to the posterior denture border to the length to the anterior denture border. The lengths of the points to the anterior denture border are a line segment p1d1, a line segment p2d2, and a line segment p3d3, a line segment q1e1, a line segment q2e2, and a line segment q3e3, and a line segment om corresponding to the maxillary denture base. In addition, the lengths of the points to the posterior denture border are obtained by determining points (b1, b2, and b3 as points corresponding to p1, p2, and p3, and c1, c2, and c3 as points corresponding to q1, q2, and q3) where perpendicular lines intersect the posterior denture border when perpendicular lines to the line segment op or the line segment oq on which the respective points are present are drawn, and determining relative lengths with respect to the line segment pq of line segments connecting intersections of the denture border on both sides with the respective points interposed therebetween, that is, a line segment d1b1, a line segment d2b2, a line segment d3b3, a line segment e1c1, a line segment e2c2, and a line segment e3c3.

The preferred planar shape of the mandibular denture base is a shape in which the length of the line segment om is from 0.74 to 0.94, the length of each of the line segment p1d1 and the line segment q1e1 is from 0.11 to 0.32, the length of each of the line segment p2d2 and the line segment q2e2 is from 0.13 to 0.34, the length of each of the line segment p3d3 and the line segment q3e3 is from 0.14 to 0.33, the length of each of the line segment d1b1 and the line segment e1c1 is from 0.14 to 0.40, the length of each of the line segment d2b2 and the line segment e2c2 is from 0.19 to 0.41, and the length of each of the line segment d3b3 and the line segment e3c3 is from 0.21 to 0.42. In this case, from the positional relationship of the respective points, p1b1>p1d1, e1c1>q1e1, p2b2>p2d2, e2c2>q2e2, p3b3>p3d3, and e3c3>q3e3 are satisfied.

(7-2. With Regard to Preferred Three-Dimensional Shape)

In the reference denture of the present invention, based on the new finding "in the above-mentioned preliminary check, the portions in which the frequently for inappropriate contact with a mucosa of a patient and the like is high are the periphery of the denture border of the base anterior region and the periphery of the denture border of the base posterior region, and the latter can be dealt with by optimizing the planar shape, but the former cannot be dealt with only by optimizing the planar shape" found by the inventors of the present invention, the height of the base anterior region is lowered and the thickness thereof is reduced at such a level that an inappropriate contact portion does not occur to the extent possible.

In the present invention, the preferred ranges of such height and width (thickness) of the base anterior region are defined through use of a predetermined cross-section described below.

(7-3. With Regard to Cross-Section Serving as Reference for Defining Preferred Three-Dimensional Shape)

Figure 8:
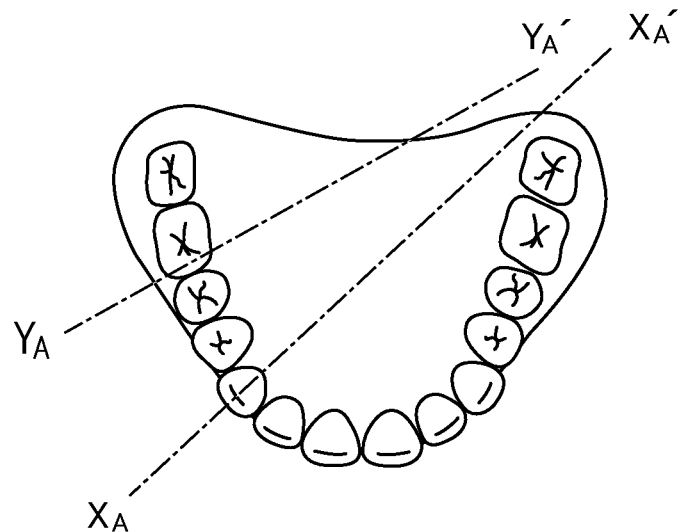
FIG. 8 is a schematic view for illustrating a preferred three-dimensional shape of the maxillary denture of a full denture (complete denture) type which is a canine and first molar-including form according to the one embodiment of the present invention and illustrating a position of an $X_A$-$X_A'$ cross-section serving as an "artificial canine vertical cross-section" and a position of a $Y_A$-$Y_A'$ cross-section serving as an "artificial first molar vertical cross-section".
Figure 9:
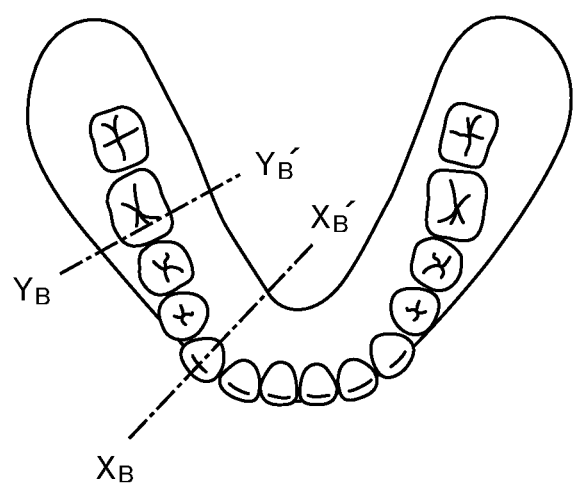
FIG. 9 is a schematic view for illustrating a preferred three-dimensional shape of the mandibular denture of a full denture (complete denture) type which is a canine and first molar-including form according to the one embodiment of the present invention and illustrating a position of an $X_B$-$X_B'$ cross-section serving as an "artificial canine vertical cross-section" and a position of a $Y_B$-$Y_B'$ cross-section serving as an "artificial first molar vertical cross-section".

In the reference denture of the present invention, focus is given on one artificial tooth and, the artificial tooth is defined as a reference artificial tooth. A specific point on the reference artificial tooth is defined as a reference point, and the reference denture is placed on a plane assumed as an occlusal plane with the artificial tooth side facing downward. In this case, the above-mentioned height and width (thickness) are defined based on a shape of a vertical cross-section (hereinafter sometimes referred to as "reference artificial tooth vertical cross-section") cut on a surface along a normal direction to the polished surface of the base anterior region, which is perpendicular to the occlusal plane and passes through the reference point of the reference artificial tooth. Although the detail is described later, for example, the positional relationship between an "artificial canine vertical cross-section" (corresponding to an $X_A$-$X_A'$ cross-section) that is the "reference artificial tooth vertical cross-section" in the maxillary reference denture when the reference artificial tooth is an artificial canine and the polished surface of the above-mentioned base anterior region is as illustrated in FIG. 8, and the positional relationship between an "artificial canine vertical cross-section" (corresponding to an $X_B$-$X_B'$ cross-section) that is the "reference artificial tooth vertical cross-section" in the mandibular reference denture and the polished surface of the above-mentioned base anterior region is as illustrated in FIG. 9.

Before the preferred shape of the above-mentioned "reference artificial tooth vertical cross-section" is described, the "occlusal plane" is described. First, occlusion is described. The occlusion means a state in which upper and lower teeth are engaged with each other, and a surface on which the upper and lower teeth are brought into close contact with each other is called an "occlusal surface". In general, natural teeth are lined up in the form of a curve protruding downward (this curve is also called the curve of Spee) while reflecting the shape of the jaw, and hence the above-mentioned occlusal surface also reflects the arrangement state of the natural teeth to form a curved surface that draws a relatively large arc when viewed from the side. The curvature radius of the above-mentioned curved surface serving as the occlusal surface is relatively large, and hence can be approximated with a plane. Then, the plane thus approximated is an "occlusal plane".

It is conceived to be medically ideal that the above-mentioned "occlusal plane" is present at a position, which is parallel to a plane called the "Camper's plane" that is an imaginary plane connecting the lower edge of the nasal wing and the upper edges of the tragus on both sides and which is located below by about 20 mm (usually, 18 mm to 22 mm) from the subnasale in a direction perpendicular to the Camper's plane. Also in the denture, the following is common. Under a state in which the denture is worn in an oral cavity of a patient, and teeth of an upper jaw and a lower jaw (here, the teeth mean artificial teeth fixed to the denture, and natural teeth when the patient has the natural teeth) are brought into close contact with each other to the extent possible, the denture is adjusted for a shape so that the above-mentioned "occlusal plane" is arranged at a position at which the range of inclination of the plane from the above-mentioned position falls within a range of from +4° to −7.64° in terms of an elevation angle (hereinafter such a position is sometimes referred to as "ideal position" or "medically ideal position").

The "occlusal plane" (arranged at the ideal position) when the denture is worn under a state of an upright upper body is a plane inclined at a certain angle (with individual differences) from a horizontal plane. An "imaginary occlusal plane" PA assumed as the "occlusal plane" arranged at a position at which the occlusal plane is medically supposed to be present in an oral cavity of a patient is described with reference to FIG. 7, FIGS. 10(a) and (b), and FIGS. 11(a) and (b). In FIG. 7 for illustrating the ideal occlusal state, a plane defined by the following three points A1, A2, and A3 corresponds to the "imaginary occlusal plane" PA. Here, the point: A1 represents a midpoint of a mesial angle of each of left and right central incisors 31B1 of the mandibular reference denture 10B, the point: A2 represents a distobuccal cusp tip of a left second molar 31B7 of the mandibular reference denture 10B, and the point A3 represents a distobuccal cusp tip of a right second molar 31B7 of the mandibular reference denture 10B.

The "occlusal plane" and the position at which the occlusal plane is supposed to be arranged ("ideal position") is defined in a precise sense as described above. However, the reference denture of the present invention is not always required to be a full denture (complete denture), and in addition, the maxillary reference denture and the mandibular reference denture are not required to be a set. In addition, in determining the above-mentioned reference artificial tooth vertical cross-section, the "occlusal plane" is not required to be arranged at the "ideal position", and the reference artificial tooth vertical cross-section can also be determined while the occlusal plane is arbitrarily inclined as long as the relative relationship is kept. For example, when the occlusal plane is inclined to be horizontal, the above-mentioned reference artificial tooth vertical cross-section becomes a vertical surface along the normal direction to the polished surface in the anterior region passing through the above-mentioned reference point. Accordingly, based on the fact that all the artificial teeth can be brought into close contact with the "occlusal surface" and "occlusal surface" is approximated with a plane ("occlusal plane"), and the plane may be defined by at least three points, the reference artificial tooth vertical cross-section is determined in the present invention as described below. Regarding a reference denture base having three or more artificial teeth fixed thereto, a vertical surface along the normal direction to the anterior polished surface passing through the above-mentioned reference point when the reference denture base is placed on a horizontal plane with the artificial teeth facing downward is defined as the reference artificial tooth vertical cross-section. In addition, regarding a reference denture base having less than three artificial teeth, a state in which the reference denture base is normally worn is assumed, and a vertical surface along the normal direction to the anterior polished surface passing through the above-mentioned reference point when the reference denture base is held on a horizontal plane without changing the relative positional relationship with the "occlusal plane" in this case is defined as the reference artificial tooth vertical cross-section. The teeth have irregularities at distal ends thereof, and the teeth are occluded while the upper and lower teeth are slightly displaced or in the case of a partial denture, slight displacement from the "occlusal plane" changes depending on the position. Accordingly, when the reference denture base is placed on a horizontal plane with the artificial teeth facing downward, the reference artificial tooth vertical cross-section based on the horizontal plane may be slightly displaced from the reference artificial tooth vertical cross-section based on the occlusal plane, and this displacement has almost no effect in defining a preferred three-dimensional shape described later and can be ignored.

(7-4. With Regard to Preferred Three-Dimensional Shape of Reference Denture of Present Invention)

A preferred three-dimensional shape is described with reference to FIG. 8 and FIG. 10(*a*) and FIG. 9 and FIG. 11(*a*) through use of the above-mentioned reference artificial tooth vertical cross-section determined as described above. In the reference denture of the present invention used as the above-mentioned reference denture member of the denture of the present invention having the above-mentioned canine-including form, a preferred three-dimensional shape is defined by an "artificial canine vertical cross-section" that is the "reference artificial tooth vertical cross-section" when the artificial canine 31A3 is defined as a reference artificial tooth, and a cusp tip 31A3*p* thereof is defined as a reference point. The above-mentioned "artificial canine vertical cross-section" corresponds to an $X_A$-$X_A'$ cross-section in FIG. 8 and an $X_B$-$X_B'$ cross-section in FIG. 9, and the cross-sectional shapes thereof are illustrated in FIG. 10(*a*) and FIG. 11(*a*), respectively. The width (thickness) of the above-mentioned base anterior region on a lower side by 2 mm from a denture border side distal end of the above-mentioned base anterior region in the "artificial canine vertical cross-section" is preferably from 0.5 mm to 3 mm, particularly preferably from 0.5 mm to 2 mm. In addition, the width (thickness) of the above-mentioned base anterior region on a lower side by 4 mm from the denture border side distal end of the above-mentioned base anterior region in the above-mentioned artificial canine vertical cross-section is also preferably 0.5 mm or more and 3 mm or less, particularly preferably from 0.5 mm to 2 mm. When the above-mentioned widths (thicknesses) are set to fall within such ranges, practical strength can be secured, and the labor for grinding a flange in the preliminary check can be further reduced.

Further, in the reference denture of the present invention, it is preferred that the artificial canine vertical cross-section satisfy the following conditions depending on whether the reference denture is a maxillary reference denture or a mandibular reference denture.

(7-5. With Regard to Preferred Three-Dimensional Shape of Maxillary Reference Denture of Present Invention)

Specifically, as illustrated in FIG. 8 and FIG. 10(*a*), when the reference denture of the present invention is a maxillary reference denture, first, the height difference (sometimes simply described as "LA1") between the denture border side distal end of the base anterior region and the reference point (cusp tip 31A3*p* of the artificial canine 31A3) in the above-mentioned artificial canine vertical cross-section (corresponding to the $X_A$-$X_A'$ cross-section in FIG. 8) is preferably from 13 mm to 20 mm, more preferably from 15 mm to 17 mm. The above-mentioned height difference is a height difference in which the occlusal plane PA is defined as a reference and a direction perpendicular to the occlusal plane PA is defined as a height direction, and this point similarly applies to another height difference that defines a preferred three-dimensional shape.

Second, from the viewpoint that the adjustment allowance in a relatively anterior portion of the base palatal plate portion becomes large and inappropriate contact can be made less liable to occur, in the above-mentioned artificial canine vertical cross-section, the height difference (sometimes simply described as "LA2") between a highest point HA of the base palatal plate portion and the above-mentioned reference point (cusp tip 31A3*p* of the artificial canine 31A3) is preferably from 10 mm to 16 mm, more preferably from 13 mm to 15 mm.

Third, the minimum thickness of the above-mentioned base palatal plate portion is preferably from 0.5 mm to 3 mm, more preferably from 0.5 mm to 2 mm.

In addition, as illustrated in FIG. 8 and FIG. 10(*b*), in the reference denture of the present invention used as the reference denture member of the denture of the present invention which has the above-mentioned canine and first molar-including form and which is a full denture (complete denture), in addition to satisfying the above-mentioned conditions in the artificial canine vertical cross-section, it is preferred that an "artificial first molar vertical cross-section" (corresponding to the $Y_A$-$Y_A'$ cross-section in FIG. 8) that is the "reference artificial tooth vertical cross-section" when the artificial first molar 31A6 is defined as a reference artificial tooth, and a mesiobuccal cusp tip 31A6*p* thereof is defined as a reference point satisfy the following conditions.

Specifically, fourth, the height difference (sometimes simply described as "LA3") between the denture border side distal end of the above-mentioned base anterior region and the above-mentioned reference point (mesiobuccal cusp tip 31A6*p* of the artificial first molar 31A6) in the above-mentioned artificial first molar vertical cross-section is preferably from 11 mm to 16 mm, more preferably from 12 mm to 14 mm.

Fifth, from the viewpoint that the adjustment allowance in a relatively posterior portion of the base palatal plate portion becomes large and inappropriate contact can be made less liable to occur, in the above-mentioned artificial first molar vertical cross-section, the height difference (sometimes simply described as "LA4") between a highest point HA' of the base palatal plate portion and the above-mentioned reference point (mesiobuccal cusp tip 31A6*p* of the artificial first molar 31A6) is preferably from 11 mm to 18 mm, more preferably from 15 mm to 17 mm.

(7-6. With Regard to Preferred Three-Dimensional Shape of Mandibular Reference Denture of Present Invention)

When the reference denture of the present invention is a mandibular reference denture, as illustrated in FIG. 9 and FIG. 11(*a*), the height difference (sometimes simply described as "LB1") between the denture border side distal end of the above-mentioned base anterior region and the above-mentioned reference point (cusp tip 31B3*p* of the artificial canine 31B3) in the above-mentioned artificial canine vertical cross-section (corresponding to the $X_B$-$X_B'$ cross-section in FIG. 9) is preferably from 13 mm to 18 mm, more preferably from 15 mm to 17 mm.

Second, from the viewpoint that the adjustment allowance in a relatively anterior portion of the base lingual flange portion becomes large and inappropriate contact can be made less liable to occur, in the above-mentioned artificial canine vertical cross-section, the height difference (sometimes simply described as "LB2") between a denture border side distal end HB of the above-mentioned base lingual flange portion and the above-mentioned reference point is preferably from 9 mm to 13 mm, more preferably from 10 mm to 12 mm.

Figure 11B:
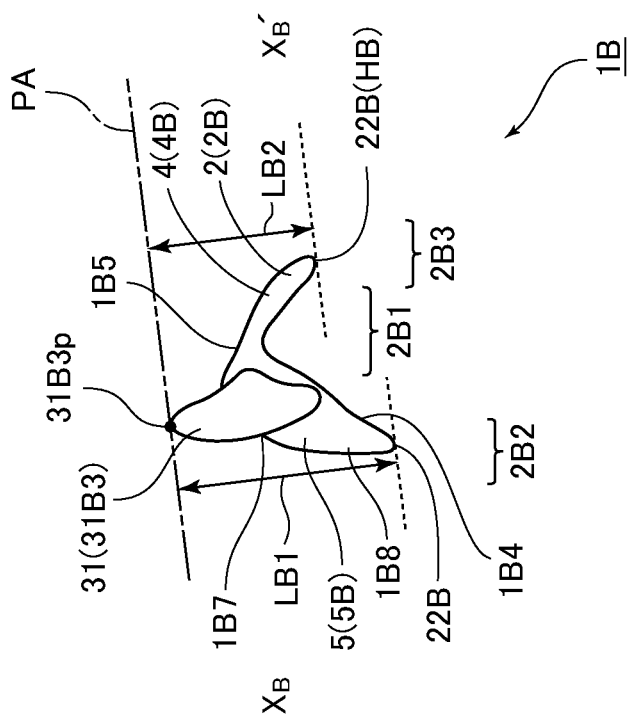
FIG. 11(b) on the right side is a view for illustrating a height difference between a denture border side distal end of a base anterior region and a maxillary first molar mesiobuccal cusp tip and a height difference between a denture border side distal end of a base lingual flange portion and the first molar mesiobuccal cusp tip in the "artificial first molar vertical cross-section".

Third, as illustrated in FIG. 9 and FIG. 11(b), the height difference (sometimes simply described as "LB3") between a denture border side distal end of the above-mentioned base anterior region and the above-mentioned reference point (mesiobuccal cusp tip 31B6$p$ of the artificial first molar 31B6) in the above-mentioned artificial first molar vertical cross-section (corresponding to the $Y_B$-$Y_B'$ in FIG. 9) is preferably from 11 mm to 15 mm, more preferably from 12 mm to 14 mm.

Fourth, from the viewpoint that the adjustment allowance in a relatively posterior portion of the base lingual flange portion becomes large and inappropriate contact can be made less liable to occur, in the above-mentioned artificial first molar vertical cross-section, the height difference (sometimes simply described as "LB4") between a denture border side distal end HB' of the above-mentioned base lingual flange portion and the above-mentioned reference point is preferably from 11 mm to 17 mm, more preferably from 14 mm to 16 mm.

(7-7. With Regard to Preferred Three-Dimensional Shape in Case of Having Preferred Planar Shape)

As described above, it is preferred that the reference denture of the present invention have a planar shape as described in JP 6294706 B. In this case, regarding the above-mentioned LA1 to LA4 and LB1 to LB4, the length of the line segment: PQ (pq), which is the above-mentioned reference length described in JP 6294706 B, is set to 1, and the length of the line segment pq in the mandibular reference denture is set to 1, and preferred lengths of the above-mentioned LA1 to LA4 and LB1 to LB4 are described in the order of a preferred range, more preferred range of the reference denture of the present invention as follows.

LA1: 0.28 to 0.50; 0.32 to 0.43
LA2: 0.21 to 0.40; 0.28 to 0.38
LA3: 0.23 to 0.40; 0.26 to 0.35
LA4: 0.23 to 0.45; 0.32 to 0.43
LB1: 0.21 to 0.35; 0.25 to 0.33
LB2: 0.15 to 0.25; 0.16 to 0.24
LB3: 0.18 to 0.29; 0.20 to 0.27
LB4: 0.18 to 0.33; 0.23 to 0.31

[8. Production Method of Present Invention]

In the production method of the present invention, the denture of the present invention is produced. It is preferred that the above-mentioned reference denture base member in the denture of the present invention to be produced in this case include a standardized predetermined shape (predetermined shape to be mass-produced) or a shape that is substantially the same as the predetermined shape, and that the above-mentioned adjusting member have a shape adjusted in conformity with the shape of an oral cavity of a patient so that, under a state in which the denture is worn in the oral cavity of an individual patient to be a wearer, an "occlusal plane" determined from an "occlusal surface" that is a surface on which teeth of an upper jaw and a lower jaw (here, the teeth mean artificial teeth fixed to the denture, and natural teeth when the patient has the natural teeth) are brought into close contact with each other is arranged at a position at which the occlusal plane is medically supposed to be present in the oral cavity of the patient.

The production method of the present invention has a first feature in which the production method includes, as basic steps, the following reference denture preparation step (A), reference denture determination step (B), building and transfer step (C), and curing step (D).

(A) A reference denture preparation step of preparing a reference denture serving as a reference denture member including a reference denture base member and artificial teeth.

(B) A reference denture determination step of determining a shape of a reference denture to be used by (1) inserting the reference denture into an oral cavity of a patient so as to place the reference denture at an appropriate position on an imaginary occlusal plane assumed as an occlusal plane arranged at a position at which the occlusal plane is medically supposed to be present in the oral cavity of the patient, to thereby check a contact state between a mucosa in the oral cavity of the patient and the reference denture or (2) inserting the reference denture into an articulator having a patient oral cavity model attached thereto so as to place the reference denture at an appropriate position on an imaginary occlusal plane assumed as an occlusal plane arranged at a position at which the occlusal plane is medically supposed to be present in the oral cavity of the patient, to thereby check a contact state between the patient oral cavity model and the reference denture, selecting, in a case of inappropriate contact in use, a reference denture having another shape that is prevented from causing the inappropriate contact or finely adjusting a shape of the reference denture base member in the reference denture so as to prevent the contact.

(C) A building and transfer step of building a curable denture base material in an uncured state for forming the adjusting member on a mucosal surface of the reference denture base member in the reference denture determined to be used in the reference denture determination step, then placing the reference denture having the curable denture base material built thereon at an appropriate position on the imaginary occlusal plane in the oral cavity of the patient or the articulator, and transferring a mucosal shape of the oral cavity of the patient or a shape of the patient oral cavity model onto the curable denture base material and forming a margin to remove the excess curable denture base material.

(D) A curing step of curing the curable denture base material that has undergone the building and transfer step.

In addition, the production method of the present invention has a second feature in which the building and transfer step (C) and the curing step (D) each include a plurality of steps, specifically, the following steps (C1), (C2) and (C3), and steps (D1), (D2), and (D3), respectively.

[Steps (C1), (C2), and (C3) Included in Building and Transfer Step (C)]

(C1) A central building and transfer step of building the curable denture base material in an uncured state in a base central region of the reference denture base member and transferring the shape of the oral cavity of the patient or the shape of the patient oral cavity model.

(C2) An anterior building and transfer step of building the curable denture base material in an uncured state in the base anterior region of the reference denture base member, and transferring the shape of the oral cavity of the patient or the shape of the patient oral cavity model and extending the curable denture base material in an uncured state from a denture border to form a margin.

(C3) A posterior building and transfer step of building the curable denture base material in an uncured state in the base posterior region of the reference denture base member, and transferring the shape of the oral cavity of the patient or the shape of the patient oral cavity model and extending the curable denture base material in an uncured state from a denture border to form a margin.

In addition, in the production method of the present invention, the curing step (D) includes the following respective steps (D1), (D2), and (D3). However, as described later, those steps are not always required to be performed separately, and two or three steps may also be performed simultaneously.

[Steps (D1), (D2), and (D3) Included in Curing Step (D)]

(D1) A step of curing the curable denture base material that has undergone the central building and transfer step.

(D2) A step of curing the curable denture base material that has undergone the anterior building and transfer step.

(D3) A step of curing the curable denture base material that has undergone the posterior building and transfer step.

The production method of the present invention has a third feature in which the plurality of steps included in the building and transfer step (C) are performed in multiple stages in a specific order. That is, after the step (C1) is performed, the step (C2) and the step (C3) are performed. The anterior building and transfer step (C2) and the posterior building and transfer step (C3) may be performed simultaneously or individually.

In each of the steps (C1) to (C3), when the shape of the mucosa in the oral cavity of the patient or the shape of the patient oral cavity model is transferred, it is required to place the reference denture having the curable denture base material in an uncured state built thereon at an appropriate position on a plane assumed as the occlusal plane. In the step (C1) to be performed first, the mucosal surface of the base central region has an advantage of ease of positioning due to a small curvature radius thereof. Meanwhile, mere application of a slight force is liable to cause the front and back of a portion having the force applied thereto to wobble upward and downward with the portion as a fulcrum. Accordingly, in order to place the reference denture at the appropriate position with satisfactory accuracy while suppressing the occurrence of such wobbling, it is preferred to use a positioning jig 200 illustrated in FIG. 6 as described above.

When a maxillary denture and a mandibular denture are produced as a set, it is preferred to perform the transfer in the step (C1) by building a curable denture base material in an uncured state on a mucosal surface of a base central region of any one of a maxillary reference denture and a mandibular reference denture, holding the reference denture having the curable denture base material built thereon on the positioning jig 200, then inserting the reference denture into the oral cavity of the patient or the articulator, and holding the reference denture at the appropriate position. From the viewpoint of reproducing the relationship between the upper jaw and the lower jaw, when the maxillary denture is produced first, it is more preferred that the transfer be performed by holding only the maxillary reference denture on the positioning jig 200, and in the transfer of the mandibular reference denture to be performed next, the transfer be performed by holding the maxillary deference denture and the mandibular reference denture simultaneously (in a set) on the positioning jig 200. Any one of the maxillary denture and the mandibular reference denture may be produced first.

Positioning (holding at an appropriate position) in the step (C2) and/or the step (C3) after completion of the step (C1) is facilitated with less wobbling, and hence any skilled person can perform positioning separately for the maxillary reference denture and the mandibular reference denture without using the positioning jig. In addition, anyone other than the skilled person can easily perform highly accurate transfer through use of the positioning jig 200. In this case, the step (C2) and/or the step (C3) may be performed with any one of the maxillary reference denture and the mandibular reference denture being held. However, in order to perform the highly accurate transfer more reliably, it is preferred that the transfer be performed with both the reference dentures being held on the positioning jig 200.

In the curing step (D), after each of the building and transfer steps is completed, the respective curing steps (D1) to (D3) corresponding to the building and transfer steps may be individually performed. Alternatively, after completion of all the building and transfer steps corresponding to the completed building and transfer steps, the respective curing steps (D1) to (D3) may be simultaneously performed. For example, when the steps (C2) and (C3) are formed after completion of the step (C1) and the step (D1), the curing step (D2) and the curing step (D3) may be simultaneously performed after completion of both the building and transfer steps, or may be individually performed after completion of the each of the building and transfer steps. In addition, the steps (C2) and (C3) may be performed without performing the step (D1) after completion of the step (C1), and after that, (D1), (D2), and (D3) may be simultaneously performed at a time.

In the production method of the present invention, when the shape of the curable denture base material is formed into the shape of the adjusting member, the step (C1) may be performed as the first step, and then the building and transfer steps (C1) to (C3) may be repeated a plurality of times.

In addition, after completion of the anterior building and transfer step and the posterior building and transfer step, a wash step of adding the curable denture base material in an uncured state onto a surface on a mucosal surface side of the reference denture base to correct a shape of the surface on the mucosal surface side may be further included.

The wash step may be performed, for example, by adding a small amount of the curable denture base material in an uncured state onto a surface of a mucosal surface side of the reference denture base to finely correct the shape so as to obtain more satisfactory adaptability and curing the curable denture base material after completion of the anterior building and transfer step and the posterior building and transfer step, and before performance of the final curing step or after completion of the curing steps (D1), (D2) and (D3).

In the production method of the present invention, the reference denture member is inserted into the oral cavity of the patient or the articulator having the patient oral cavity model attached thereto so that the reference denture member is arranged at an appropriate position on a plate assumed as the occlusal plane in the reference denture determination step (B), and in addition, in the building and transfer step (C), the reference denture member having the curable denture base material for a predetermined adjusting member built at a predetermined position of the reference denture base member is placed at an appropriate position on a plane assumed as the occlusal plane in the oral cavity of the patient or the articulator.

In this case, from the viewpoint that it is not required to produce a patient oral cavity model that requires labor and time for production, it is preferred to insert the reference denture member into the oral cavity of the patient. However, when dentures of a large number of patients are produced in a dental laboratory, although labor and time for producing a patient oral cavity model are taken, it is preferred to use an articulator having a patient oral cavity model attached thereto because a large number of dentures can be produced in parallel at a time.

In this case, the articulator is not particularly limited as long as the articulator is a device configured to reproduce jaw movement and various positions of occlusion on a model. For example, a condyle-type articulator configured to reproduce the movement path indicated by the mandibular condyle during jaw movement, a non-adjustable articulator (mean value articulator) and an adjustable articulator (fully adjustable articulator, semi-adjustable articulator) among the condyle-type articulators, an arcon type having the condylar ball coupled to the lower arch and a condylar type having the condylar ball coupled to the upper arch, in which the position of the condylar ball corresponding to the mandibular condyle is different, a non-condyle-type articulator which does not reproduce a movement path indicated by the mandibular condyle but can be opened and closed upward and downward, and the like may be used as the articulator. In addition, the patient oral cavity model may be produced in accordance with the steps 1 and 2 of the customization method.

The reference denture determination step (B) corresponds to the above-mentioned preliminary check. In the method of the present invention, when the reference denture of the present invention is used as the reference denture member, the occurrence frequency of cases in which adjustment by grinding is determined to be required in the reference denture determination step (B) is low (see "non-lifting ratio" described later), and in most cases, the reference denture of the present invention can be used as it is as a reference denture member. Even when adjustment by grinding is required, the amount of grinding can be extremely small. With this, the production efficiency is greatly improved.

In addition, in the production method of the present invention, as described as the above-mentioned third feature, rough positioning is performed by first performing adaptation of the mucosal surface of the base central region. Next, in a situation in which a fluctuation width is small, adaptation of the mucosal surfaces of the anterior portion (base anterior region) and the posterior portion (base posterior region), and formation and adaptation of the margin (denture border) are performed. With this, anyone having no skilled technique can easily perform highly accurate positioning. Further, while the height of the anterior flange portion of the reference denture base and the length of the posterior portion of the reference denture base are made up for (extended) with a curable denture base material such as a liner, adaptation of a boundary can be performed so that the boundary with a mucosa of a patient has a natural state.

When the production method for a denture of the present invention is a method of producing a denture of the present invention which is a maxillary denture, the above-mentioned maxillary reference denture may be prepared as a ready-made reference denture serving as a reference denture member in the reference denture preparation step (A). When the production method for a denture of the present invention is a method of producing a denture of the present invention which is a mandibular denture, the above-mentioned mandibular reference denture may be prepared as a ready-made reference denture serving as a reference denture member in the reference denture preparation step (A).

The step (A) in the production method for a denture of the present invention is a step of simply preparing a reference denture serving as a member. Now, in the example in which the maxillary denture and the mandibular denture are produced as a set through use of the maxillary reference denture and the mandibular reference denture each corresponding to a full denture (complete denture) as a set, the steps (B), (C), and (D) are described in detail with reference to the drawings. The production method of the present invention is not limited to such an example.

(B: Reference Denture Determination Step)

Figure 5:
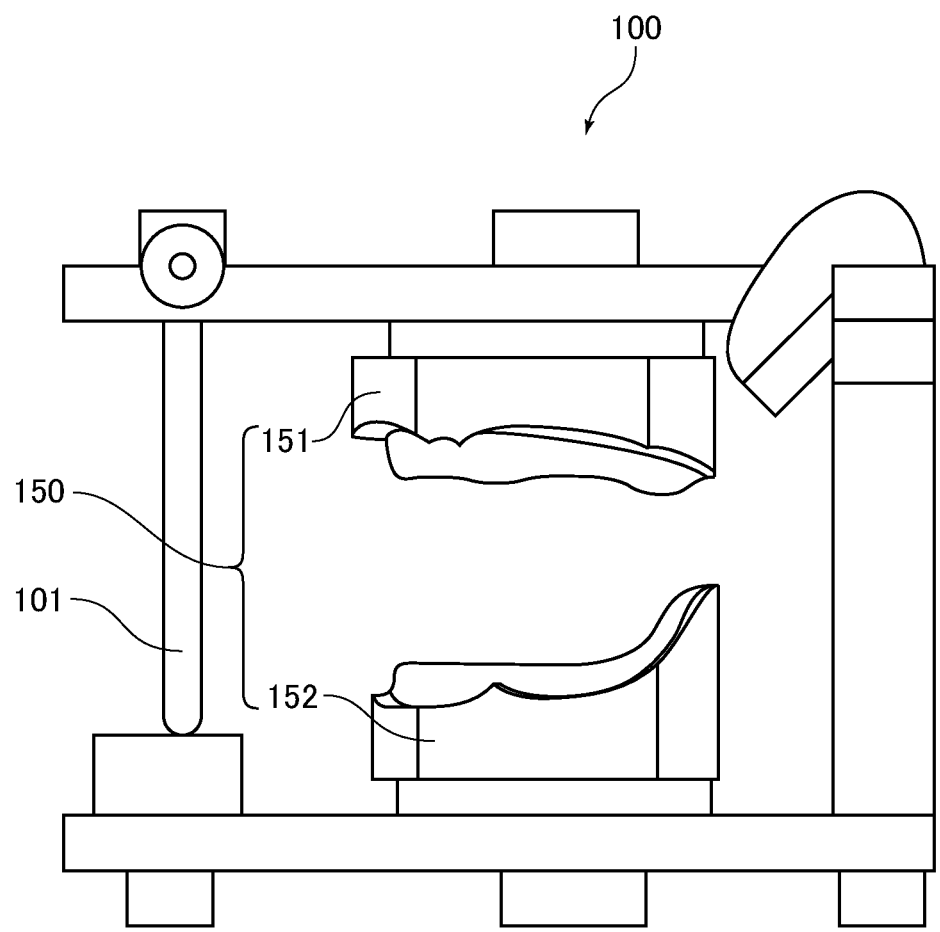
FIG. 5 is a side view for illustrating a state in which a patient oral cavity model is attached to an articulator to be used in a production method for a denture according to the one embodiment of the present invention.

The maxillary reference denture 10A and/or the mandibular reference denture 10B are placed at an appropriate position on the imaginary occlusal plane PA (see FIG. 7) assumed as an occlusal plane arranged at a position at which the occlusal plane is medically supposed to be present in an oral cavity of a patient, and the contact state between a patient oral cavity model 150, and the maxillary reference denture 10A and the mandibular reference denture 10B is checked through use of an articulator 100 as illustrated in FIG. 5 (hereinafter such a check of a contact state through use of an articulator is sometimes referred to as "lifting check").

Figure 6A:
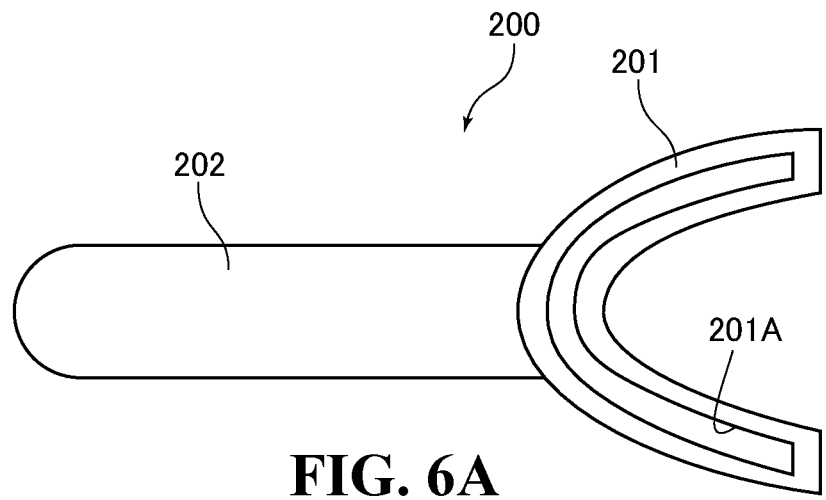
FIGS. 6(a) to (c) are each a view for illustrating a positioning jig to be used when the maxillary reference denture and the mandibular reference denture are set in the articulator or the oral cavity of the patient in the production method for a denture according to the one embodiment of the present invention.
Figure 6B:
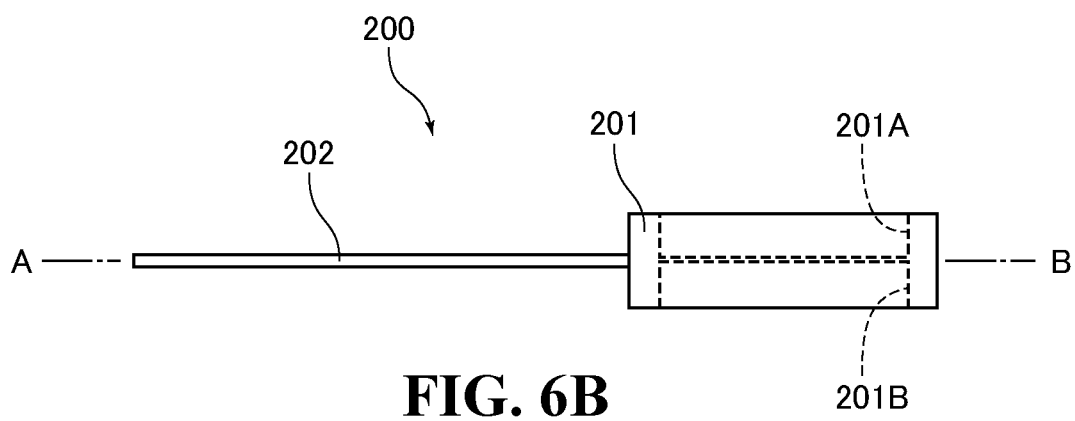
Figure 6C:
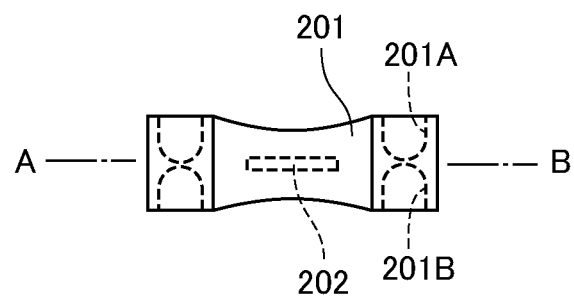

In FIG. 5, there is illustrated a state in which the patient oral cavity model 150, specifically the patient oral cavity model 150 formed of a maxillary model 151 and a mandibular model 152, is attached to the articulator 100. When the maxillary reference denture 10A and the mandibular reference denture 10B are inserted into the articulator 100 having the patient oral cavity model 150 illustrated in FIG. 5 attached thereto, and the contact state between the patient oral cavity model 150, and the maxillary reference denture 10A and the mandibular reference denture 10B is checked (lifting check is performed), it is preferred to use the positioning jig 200 as illustrated in FIG. 6.

In the positioning jig 200, a reference denture holding portion 201 and a handle portion 202 coupled to the reference denture holding portion 201 are provided. In the reference denture holding portion 201, a maxillary denture holding recess 201A configured to hold the maxillary reference denture 10A and a mandibular denture holding recess 201B configured to hold the mandibular reference denture 10B are formed. In addition, the handle portion 202 has a length to a certain degree so that a dental technician, a dentist, or the like can easily operate the handle portion 202 when setting the maxillary reference denture 10A and the mandibular reference denture 10B from the outside of the articulator 100 or from the outside of the oral cavity of the patient. Accordingly, an operator such as a dental technician can easily place the maxillary reference denture 10A and/or the mandibular reference denture 10B at an appropriate position on the imaginary occlusal plane PA (see FIG. 7) through use of the handle portion 202. Also when the contact state is checked by inserting the maxillary reference denture 10A and the mandibular reference denture 10B into the oral cavity of the patient, it is preferred to use the positioning jig 200 for the same reason.

In the above-mentioned lifting check, the contact state can be evaluated based on a floating amount (sometimes referred to as "lifting value") of a guide pin 101 of the articulator 100 when the maxillary reference denture 10A and the mandibular reference denture 10B are engaged with each other on the imaginary occlusal plane PA (see FIG. 5) so that the maxillary reference denture 10A and the mandibular reference denture 10B are caused to stand still. Specifically, when the above-mentioned floating amount (lifting value) is 0 mm or less, it is evaluated that there is no inappropriate contact, and adjustment by grinding is not required, with the result that the operation time for grinding can be reduced. Meanwhile, when the lifting value is more than 0 mm, it is evaluated that there is inappropriate contact, and when the value is larger, the grinding adjustment amount by grinding is larger. From the foregoing, the case in which the floating amount (lifting value) of the guide pin 101 is 0 mm or less is regarded as success, and the flow proceeds to a next step. The case in which the above-mentioned amount (lifting value) is less than 0 mm means a case in which the position of the guide pin 101 is not lowered, and there is a gap between the reference denture and the model. The gap in this case is filled with the adjusting member in a later step.

Here, when the lifting check is performed through use of the maxillary reference denture 10A of the present invention and the mandibular reference denture 10B of the present invention which satisfy the above-mentioned dimensional requirements, the above-mentioned floating amount of the guide pin 101 is less than 0 mm or is brought into a state in which slight grinding is sufficient.

In the above-mentioned description, the lifting check is performed through use of the articulator 100. However, the contact state may be checked as described below without performing the lifting check through use of the articulator 100. The maxillary reference denture 10A and the mandibular reference denture 10B are directly inserted into the oral cavity of the patient and placed at an appropriate position on the imaginary occlusal plane PA (see FIG. 7), and in this state, the contact state between the mucosa in the oral cavity of the patient, and the maxillary reference denture 10A and the mandibular reference denture 10B is checked. This check of the contact state also corresponds to the reference denture determination step (B).

In addition, in the reference denture determination step (B), the maxillary reference denture 10A and the mandibular reference denture 10B are held on the positioning jig 200 as illustrated in FIG. 6. However, without using the positioning jig 200 as described above, the maxillary reference denture 10A and the mandibular reference denture 10B may be set in the articulator 100, or the maxillary reference denture 10A and the mandibular reference denture 10B may be set in the oral cavity of the patient.

In addition, in the reference denture determination step (B), when the actual occlusal surface is displaced from an appropriate position in the check of the contact state as described above, the reference denture (maxillary reference denture 10A and mandibular reference denture 10B) may be placed at an appropriate position by making adjustment by grinding, or another reference denture that does not cause the above-mentioned positional displacement may be selected.

(C: Building and Transfer Step)

In this step, a curable denture base material in an uncured state for forming the above-mentioned adjusting member is built on a surface on a mucosal side of the above-mentioned reference denture base member in the reference denture determined to be used in the reference denture determination step (B), for example, the maxillary reference denture base 20A of the maxillary reference denture 10A.

The above-mentioned curable denture base material is usually built after removing the maxillary reference denture 10A and the mandibular reference denture 10B from the positioning jig 200, but may be built while the maxillary reference denture 10A and the mandibular reference denture 10B are set on the positioning jig 200.

As described above, this step includes (C1), (C2), and (C3), and the contents and execution order thereof are as described above.

In addition, in the building and transfer step, the above-mentioned built curable denture base material is formed into a shape of the above-mentioned adjusting member. For example, the maxillary reference denture 10A and the mandibular reference denture 10B, having the curable denture base material built thereon, are set again on the positioning jig 200 and placed at an appropriate position in the articulator 100. After that, these shapes are transferred to the curable denture base material under a state in which the denture base material is pressed against the maxillary model 151 and the mandibular model 152 and the maxillary model 151 and the mandibular model 152 are engaged with each other. After such transfer, under a state in which the maxillary reference denture 10A and the mandibular reference denture 10B are set on the positioning jig 200, the maxillary reference denture 10A and the mandibular reference denture 10B are once taken out from the articulator 100. After that, the excess curable denture base material is removed from the maxillary reference denture 10A and the mandibular reference denture 10B.

At this time, the maxillary reference denture 10A and the mandibular reference denture 10B, having the curable denture base material built thereon, may be directly pressed against the inside of the oral cavity of the patient through use of the positioning jig 200 without using the articulator 100 to transfer the shape of the inside of the oral cavity of the patient. In addition, those operations may also be performed without using the positioning jig 200.

(D: Curing Step)

In this step, the above-mentioned curable denture base material formed into a shape of the adjusting member in the building and transfer step (C) is cured to form the adjusting member, and the adjusting member is integrated with the reference denture base member.

Polymerization curing is appropriately determined depending on the kind of a polymerization initiator contained in the curable denture base material. For example, in the case of a photopolymerization type using a photopolymerization initiator, the denture base material can be cured by irradiation with light such as UV rays that activate the initiator. In addition, in the case of a thermal polymerization type using a thermal polymerization initiator, the denture base material can be cured by heating. In addition, in the case of a chemical polymerization type using a chemical polymerization initiator, the denture base material can be cured after a predetermined period of time.

Through each of the steps as described above, a denture using the maxillary reference denture 10A and the mandibular reference denture 10B can be produced.

EXAMPLES

In order to specifically describe the present invention, the present invention is described by way of Examples and Comparative Examples, but the present invention is not limited thereto.

[1. With Regard to Denture of Present Invention and Reference Denture of Present Invention]

Examples 1 to 12 and Comparative Examples 1 and 2

(1) Production of Reference Denture

Each reference denture base having a surface shape shown in Table 1 and a partial sectional shape shown in Table 2 was produced by subjecting a polymethylmethacrylate resin to injection molding through use of a plaster mold produced by a lost-wax method. Next, artificial teeth were arranged on the produced reference denture base to produce a maxillary reference denture and a mandibular reference denture of a complete denture type.

The symbols, such as OM and P1D1, in Table 2 mean respective line segments described in (7-1. With regard to Preferred Planar Shape), and the numerical values in each symbol column mean relative lengths (lengths when the length of the line segment PQ or the line segment pq is 1) of the line segment of the symbol. In addition, LA1 to LA4 and LB1 to LB4 in Table 3 conform to the definitions in (7-5. With regard to Preferred Three-dimensional Shape of Maxillary Reference Denture of Present Invention, and 7-6. With regard to Preferred Three-dimensional Shape of Mandibular Reference Denture of Present Invention). In addition, the thickness means a minimum thickness of the base palatal plate portion 20A3 of the maxillary reference denture.

TABLE 1

| | | Planar shape of reference denture | | | | | | | | | | |
|---|---|---|---|---|---|---|---|---|---|---|---|---|
| | | Maxillary | | | | Mandibular | | | | | | |
| No. | | OM | P1D1 | P2D2 | P3D3 | om | p1d1 | p2d2 | p3d3 | d1b1 | d2b2 | d3b3 |
| Example | 1 | 0.87 | 0.24 | 0.32 | 0.31 | 0.85 | 0.22 | 0.24 | 0.24 | 0.27 | 0.30 | 0.32 |
| | 2 | 0.87 | 0.24 | 0.32 | 0.31 | 0.85 | 0.22 | 0.24 | 0.24 | 0.27 | 0.30 | 0.32 |
| | 3 | 0.87 | 0.24 | 0.32 | 0.31 | 0.85 | 0.22 | 0.24 | 0.24 | 0.27 | 0.30 | 0.32 |
| | 4 | 0.87 | 0.24 | 0.32 | 0.31 | 0.85 | 0.22 | 0.24 | 0.24 | 0.27 | 0.30 | 0.32 |
| | 5 | 0.87 | 0.24 | 0.32 | 0.31 | 0.85 | 0.22 | 0.24 | 0.24 | 0.27 | 0.30 | 0.32 |
| | 6 | 0.87 | 0.24 | 0.32 | 0.31 | 0.85 | 0.22 | 0.24 | 0.24 | 0.27 | 0.30 | 0.32 |
| | 7 | 0.87 | 0.24 | 0.32 | 0.31 | 0.85 | 0.22 | 0.24 | 0.24 | 0.27 | 0.30 | 0.32 |
| | 8 | 0.87 | 0.24 | 0.32 | 0.31 | 0.85 | 0.22 | 0.24 | 0.24 | 0.27 | 0.30 | 0.32 |
| | 9 | 0.87 | 0.24 | 0.32 | 0.31 | 0.85 | 0.22 | 0.24 | 0.24 | 0.27 | 0.30 | 0.32 |
| | 10 | 0.87 | 0.24 | 0.32 | 0.31 | 0.85 | 0.22 | 0.24 | 0.24 | 0.27 | 0.30 | 0.32 |
| | 11 | 0.98 | 0.36 | 0.45 | 0.45 | 0.94 | 0.32 | 0.34 | 0.33 | 0.4 | 0.41 | 0.42 |
| | 12 | 0.76 | 0.11 | 0.19 | 0.16 | 0.74 | 0.11 | 0.13 | 0.14 | 0.14 | 0.19 | 0.21 |
| Comparative | 1 | 1.29 | 0.28 | 0.42 | 0.40 | 1.00 | 0.23 | 0.34 | 0.35 | 0.37 | 0.43 | 0.44 |
| Example | 2 | 0.87 | 0.24 | 0.32 | 0.31 | 0.85 | 0.22 | 0.24 | 0.24 | 0.27 | 0.30 | 0.32 |

TABLE 2

| | | Partial sectional shape of reference denture | | | | | | | | |
|---|---|---|---|---|---|---|---|---|---|---|
| | | Maxillary reference denture (mm) | | | | Mandibular reference denture (mm) | | | | Thickness |
| No. | | LA1 | LA2 | LA3 | LA4 | LB1 | LB2 | LB3 | LB4 | (mm) |
| Example | 1 | 16 | 14 | 13 | 16 | 16 | 11 | 13 | 15 | 2 |
| | 2 | 15 | 13 | 12 | 15 | 15 | 10 | 12 | 14 | 2 |
| | 3 | 17 | 15 | 14 | 17 | 17 | 12 | 14 | 16 | 2 |
| | 4 | 13 | 10 | 11 | 11 | 13 | 9 | 11 | 11 | 2 |
| | 5 | 20 | 16 | 16 | 18 | 18 | 13 | 15 | 17 | 2 |
| | 6 | 12 | 9 | 10 | 10 | 12 | 8 | 10 | 10 | 2 |
| | 7 | 21 | 17 | 17 | 19 | 19 | 14 | 16 | 18 | 2 |
| | 8 | 16 | 14 | 13 | 16 | 16 | 11 | 13 | 15 | 0.5 |
| | 9 | 16 | 14 | 13 | 16 | 16 | 11 | 13 | 15 | 3 |
| | 10 | 16 | 14 | 13 | 16 | 16 | 11 | 13 | 15 | 4 |
| | 11 | 16 | 14 | 13 | 16 | 16 | 11 | 13 | 15 | 2 |
| | 12 | 16 | 14 | 13 | 16 | 16 | 11 | 13 | 15 | 2 |
| Comparative | 1 | 24 | 24 | 23 | 19 | 24 | 22 | 24 | 23 | 8 |
| Example | 2 | 22 | 18 | 18 | 20 | 20 | 15 | 17 | 19 | 5 |

As described later, dentures produced through use of the reference dentures of Comparative Examples 1 and 2 do not correspond to the denture of the present invention.

(2) Production of Denture
(2-1) Preparation of Patient Oral Cavity Model

20 Kinds (20 sets) of "patient oral cavity models each formed of a set of a toothless maxillary model and a toothless mandibular model" having different shapes were prepared. In Table 3, there is shown a state of a variation in shape of a patient oral cavity model for an upper jaw and a patient oral cavity model for a lower jaw regarding the above-mentioned 20 kinds (sets) of patient oral cavity models.

TABLE 3

| | | Variation | | |
|---|---|---|---|---|
| | Measurement portion | min(mm) | max(mm) | Standard deviation |
| Upper jaw | Anterior teeth portion alveolar crest height | 9.0 | 16.0 | 1.45 |
| | Posterior teeth portion alveolar crest height | 8.0 | 17.0 | 1.50 |
| | PQ | 40.0 | 46.0 | 2.54 |

TABLE 3-continued

| | | Variation | | |
|---|---|---|---|---|
| | Measurement portion | min(mm) | max(mm) | Standard deviation |
| Lower jaw | Anterior teeth portion alveolar crest height | 6.0 | 19.0 | 3.88 |
| | Posterior teeth portion alveolar crest height | 5.0 | 17.0 | 3.41 |
| | pq | 52.0 | 60.0 | 2.56 |

The state of a variation shown in Table 3 is represented by a minimum value: min(mm), a maximum value (mm), and a standard deviation obtained by measuring an "anterior portion alveolar crest height" and a "molar teeth portion alveolar crest height" regarding each of the patient oral cavity models and the line segment PQ (in the case of the maxillary model) and the line segment pq (in the case of the mandibular model) described in "7-1. With regard to Preferred Planar Shape". Here, the "alveolar crest height" means a vertical distance from the alveolar crest to the occlusal plane. Then, in the maxillary model, in portions obtained by equally dividing the distance from a "foremost portion of an incisive papilla" to an "intersection between a line connecting a left pterygomaxillary notch and a right pterygomaxillary notch and a median palatine sature" into three parts, the alveolar crest height in a front one third is defined as the "anterior teeth portion alveolar crest height" and the alveolar crest height in a back one third is defined as the "molar teeth portion alveolar crest height". In addition, in the mandibular model, in portions obtained by equally dividing the distance from a "midline portion of an alveolar crest" to an "intersection between a line connecting a front edge of a left retromolar pad and a front edge of a right retromolar pad and a midline" into three parts, the alveolar crest height in a front one third is defined as the "anterior teeth portion alveolar crest height" and the alveolar crest height in a back one third is defined as the "molar teeth portion alveolar crest height".

(2-2) Production of Denture

A total of 20 sets of dentures respectively adapted to the above-mentioned 20 sets of patient oral cavity models were produced in each of the Examples through use of the reference denture of each of the Examples and each of the Comparative Examples shown in Tables 1 and 2. Specifically, the articulator illustrated in FIG. 5 was prepared as an articulator. The positioning jig illustrated in FIG. 6 was prepared as a positioning jig. In addition, 20 kinds (20 sets) of "patient oral cavity models each formed of a set of a toothless maxillary model and a toothless mandibular model" having different shapes shown in Table 3 were prepared as the above-mentioned patient oral cavity models. Then, one set out of the 20 sets of patient oral cavity models was set in the articulator, and a denture adapted to the patient oral cavity model was produced as described below.

Specifically, a reference denture to be used has already been prepared. Accordingly, a maxillary reference denture was first held on the positioning jig to check the presence or absence of inappropriate contact. When inappropriate contact was recognized (contact was determined to be inappropriate), adjustment by grinding using a handy grinder was made until the inappropriate contact was eliminated (contact became appropriate) (reference denture determination step B). After that, the reference denture determination step (B) was performed in the same manner also with respect to a lower jaw. Next, a curable denture base material in an uncured state was built on a mucosal surface of a base central region of the maxillary reference denture. Only the maxillary reference denture obtained after the building was held on the positioning jig. The resultant was inserted into the articulator and held at the appropriate position. Then, the transfer in the step (C1) was performed. After that, also for a mandibular reference denture, a curable denture base material in an uncured state was built on a mucosal surface of a base central region. The mandibular reference denture obtained after the building and the maxillary reference denture after the transfer were simultaneously held (as a set) on the positioning jig. Then, the resultant was inserted into the articulator and held at the appropriate position. Then, the transfer in the step (C1) was performed. After the transfer in the step (C1) was performed as described above, (C2) and (C3) were performed without performing the step (D1). In this case, in (C2) and (C3), the maxillary and mandibular reference dentures were separately inserted into the articulator through use of the positioning jig and held at the appropriate position. Then transfer and formation of a margin were performed. Then, the wash step was performed. Finally, as the step (D), all the curable denture base materials (photocurable liner: TOKUSO LIGHT-REBASE, manufactured by Tokuyama Dental Corporation) were cured at a time, to thereby produce one set of maxillary and mandibular dentures. Further, such an operation was repeated also for another patient oral cavity model, and finally, 20 sets of maxillary and mandibular dentures adapted to all the 20 sets of patient oral cavity models were produced by the production method of the present invention.

In each of Examples 1 to 12, the denture of the present invention, in which a denture border side distal end region of an entire region of a denture border in the above-mentioned anterior region is formed of the above-mentioned anterior adjusting member, and a denture border side distal end region of an entire region of a denture border in the above-mentioned posterior region is formed of the above-mentioned posterior adjusting member, is produced. In contrast, in Comparative Examples 1 and 2, although the denture was produced by the production method of the present invention, "inappropriate contact" was recognized in the vicinity of a denture border of a base anterior region in the reference denture determination step (B), and hence the denture was produced by making adjustment by grinding. As a result, a denture border in an anterior region of the produced denture was formed of a reference denture, and an anterior adjusting member was not exposed to a polished surface of an anterior flange portion. Accordingly, the denture produced in each of Comparative Examples 1 and 2 does not correspond to the denture of the present invention, and hence the reference denture in each of Comparative Examples 1 and 2 does not correspond to the reference denture of the present invention.

(3) Evaluation of Reference Denture and Denture

In the above-mentioned production step of a denture, the adaptability (non-lifting ratio and adaptability ratio) of the used reference denture to the patient oral cavity model, and production time and adjustment time were evaluated, and the ratio of the anterior adjusting member on the polished surface of the "canine anterior flange portion" of the obtained denture (hereinafter sometimes simply referred to as "height adjustment allowance ratio") (%) was evaluated.

Now, each evaluation item is described below.

<With Regard to Evaluation of Non-Lifting Ratio>

A non-lifting ratio is an indicator for indicating "lowness of occurrence frequency" of cases in which adjustment by grinding is determined to be required due to the presence of a portion that is brought into inappropriate contact with a mucosa and the like, which may cause pain to the patient, in the reference denture determination step (B) of the production method for a denture of the present invention. In the Examples (Examples 1 to 12) and the Comparative Examples (Comparative Examples 1 and 2), the non-lifting ratio is defined as an occurrence ratio of cases that pass the test when the reference denture determination step (B) (evaluation by measuring a lifting value) using an articulator is performed for the above-mentioned 20 kinds (20 sets) of "patient oral cavity models each formed of a set of a toothless maxillary model and a toothless mandibular model" having different shapes, where it is conceived that the diversity of patients may be reflected as a realistic test method (as a method that does not require the cooperation of a large number of patients).

The above-mentioned non-lifting ratio may also be defined as an evaluation indicator reflecting the degree of universality, which serves as an indicator for indicating to which variety of patients one set of (combination) a maxillary reference denture and a mandibular reference denture to be evaluated can be applied (in other words, an indicator for evaluating the width of an adaptable range to various patients). When the value of the non-lifting ratio is higher, the degree of universality becomes higher (adaptable range to various patients becomes wider). When the value of the non-lifting ratio is 80% or more, the degree of universality is determined to be high, and the value of the non-lifting ratio is more preferably 90% or more, most preferably 100%.

The above-mentioned evaluation by measuring a lifting value was performed as follows. That is, first, the patient oral cavity model 150 formed of one set of the toothless maxillary model 151 and mandibular model 152 arbitrarily selected from 20 kinds (20 sets) having different shapes is attached to the articulator 100 as illustrated in FIG. 5. After that, the maxillary reference denture and the mandibular reference denture were held on the positioning jig 200 as illustrated in FIG. 6 so as to obtain an appropriate engagement state. Then, the resultant was inserted into the articulator 100 while maintaining the engagement state, and a floating amount (lifting value) of the guide pin 101 when the resultant was arranged so as to be engaged with each other on the occlusal plane PA is measured. Cases in which the measured lifting value reaches 0 mm or less were regarded as success, and thus success or failure was evaluated. As described above, after completion of the evaluation of the one set of patient oral cavity model 150, the patient oral cavity model 150 held on the positioning jig 200 was replaced by one arbitrary set selected from the remaining 19 sets. Then, the success or failure was evaluated in the same manner, and further, such evaluation was repeated to finally perform success or failure evaluation with respect to all the sets (20 sets). Non-lifting ratios were obtained based on the results.

<With Regard to Evaluation of Adaptability Ratio>

An adaptability ratio is an indicator for indicating the degree of an occurrence frequency of cases to be determined to be "appropriate" when a case is determined to be appropriate or inappropriate based on whether the reference denture having the curable denture base material built thereon in the building and transfer step (C) of the production method for a denture of the present invention can be arranged at an appropriate position in the articulator 100 having the patient oral cavity model 150 set therein.

In the Examples (Examples 1 to 12), in the same manner as in the non-lifting ratio measurement, 20 kinds (20 sets) of patient oral cavity models 150 having different shapes were used, and it was investigated whether or not the patient oral cavity models 150 having different shapes were able to be arranged at an appropriate position (on the occlusal plane PA). However, in order to reduce the influence of a three-dimensional shape and observe the influence of a planar shape, the maxillary reference denture and the mandibular reference denture were independently evaluated, respectively, instead of a state in which the maxillary reference denture and the mandibular reference denture were engaged with each other. Specifically, through use of the positioning jig 200 as illustrated in FIG. 6 in the articulator 100 in which the patient oral cavity model 150 formed of the toothless maxillary model 151 and mandibular model 152 was set, a maxillary reference denture (or a mandibular reference denture) having a curable denture base material built thereon was independently inserted into the maxillary model 151 (or the mandibular model 152) attached to the articulator 100, and it was determined whether or not maxillary reference denture (or the mandibular reference denture) was able to be arranged at an appropriate position. Such an operation was performed with respect to 20 kinds of the patient oral cavity models 150, and the ratio of the number of models in which the maxillary reference denture (or the mandibular reference denture) was able to be arranged at an appropriate position was defined as an adaptability ratio.

<With Regard to Evaluation of Production Time: tP>

The production time was determined as described below. That is, first, as a reference example, dentures adapted to the above-mentioned 20 kinds (20 sets) of patient oral cavity models 150 having different shapes were produced by a customization method, and time (minute) required for producing each of the dentures was measured. Based on the measured values, average time (minute) required for producing one denture was determined and represented by $t_{P-Cust}$. Next, dentures adapted to the above-mentioned 20 kinds (20 sets) of patient oral cavity models 150 having different shapes were produced through use of the maxillary reference denture and the mandibular reference denture in each of the Examples and each of the Comparative Examples. Then, in the same manner as in the forgoing, average time (minute) required for producing one denture was determined in each of the Examples and each of the Comparative Examples, and the average time was represented by $t_{P-Exp}$. Then, a percentage: $(t_{P-Exp}/t_{P-Cust} \times 100(\%))$ obtained by standardizing $t_{P-Exp}$ with $t_{P-Cust}$ was determined, and production time was evaluated with this value. When the value is lower, the denture production time is shortened as compared to the customization method.

In the production method of the present invention in the Examples, the steps (B) and (C) are performed through insertion into the patient oral cavity model. Accordingly, the time required for producing a patient oral cavity model (corresponding to the time required for "obtaining impression inside the oral cavity of the patient through use of an impression material" in the step 1 of the customization method and "producing a plaster model through use of the impression" in the step 2 of the customization method) is excluded from the above-mentioned $t_{P-Cust}$ and $t_{P-Exp}$, respectively. When the steps (B) and (C) are performed through direct insertion into the oral cavity of the patient in the production method of the present invention, the time required for producing a patient oral cavity model is not required, and hence $t_{P-Exp}$ can be shortened by that time. In this case, the effect of the present invention becomes more significant.

In order to eliminate the influence caused the difference in planar shape of the reference dentures and confirm the effect caused by the difference in three-dimensional shape, the production time is required to be compared between the reference dentures (for example, Examples 1 to 10 and Comparative Example 2) having the same planar shape.

<With Regard to Evaluation of Adjustment Time: $t_A$>

The adjustment time was determined as described below. That is, when dentures adapted to the above-mentioned 20 kinds (20 sets) of patient oral cavity models 150 having different shapes were produced through use of the maxillary reference denture and the mandibular reference denture, average time required until the reference denture was determined to be appropriate in the reference denture determination step (B) (when the reference denture was determined to be inappropriate, adjustment by grinding was performed, and the reference denture determination step was performed again and repeated until the reference denture was determined to be appropriate) was defined as adjustment time.

In the evaluation of the adjustment time, the adjustment time (minute) in Comparative Example 1 was defined as reference time $t_{A-S}$, and the adjustment time (minute) in each of the Examples and Comparative Example 2 was defined as $t_{A-Exp}$. Then, the adjustment time was evaluated with a percentage: $(t_{P-Exp}/t_{A-S}) \times 100(\%)$ obtained by standardizing $t_{A-Exp}$ with the above-mentioned reference time $t_{A-S}$. When the value of the adjustment time is lower, the denture production time is shortened as compared to Comparative Example 1.

In order to eliminate the influence caused by the difference in planar shape of the reference dentures and confirm the effect caused by the difference in three-dimensional shape also regarding the adjustment time, the adjustment time is required to be compared between the reference dentures (for example, Examples 1 to 10 and Comparative Example 2) having the same planar shape. Further, even in the reference dentures having the same planar shape, the adjustment time is influenced by the difference in three-dimensional shape, and further, the influence on the adjustment time is reflected also on the production time.

<With Regard to Evaluation of Height Adjustment Allowance Ratio>

A height adjustment allowance ratio is an indicator for indicating whether or not there is no portion that comes into inappropriate contact with a mucosa and the like, which causes pain to the patient, and there is an adjustment allowance for adding the adjustment member when dentures adapted to the above-mentioned 20 kinds (20 sets) of patient oral cavity models 150 having different shapes are produced through use of the maxillary reference denture and the mandibular reference denture. In the Examples and the Comparative Examples, the ratio of the height of the adjusting member to the height of the canine anterior flange portion of the reference denture is defined as the height adjustment allowance ratio.

In evaluation of the height adjustment allowance ratio, a height (mm) from the cervical line of the denture to the denture border is defined as a reference height $h_S$, and a height difference (mm) from the denture border of the reference denture to the denture border of the denture is defined as a height $h_{Adj}$ of the adjusting member. Then, the height adjustment allowance ratio was evaluated by a percentage: $(h_{Adj}/t_S) \times 100(\%)$ obtained by standardizing the height $h_{Adj}$ of the adjusting member with the above-mentioned reference height $h_S$. When the height adjustment allowance ratio is smaller, the adjustment allowance is smaller. The case of the height adjustment allowance ratio of 0% corresponds to a case in which the height has been adjusted by grinding the reference denture.

The obtained evaluation results are shown in Table 4.

As shown in Table 4, in Examples 1 to 12, reference dentures having the shapes shown in Tables 1 and 2 were produced, and evaluated for an adaptability ratio, a non-lifting ratio, production time, adjustment time, and a height adjustment ratio. The evaluation results became satisfactory results as shown in Table 4.

Meanwhile, in Comparative Example 1 in which 20 dentures are produced through use of, as a reference denture, a denture produced by the customization method so as to be adapted to one set of patient oral cavity model randomly selected from the above-mentioned 20 sets, an adjustment allowance is not formed unlike the Examples, and hence inappropriate contact cannot be avoided in the 19 patient oral cavity models. Thus, it is required to adjust the reference denture having a large height and a large thickness to the oral cavity by grinding, and the height adjustment allowance ratio becomes 0%, with the result that both the adjustment time and the production time become significantly long.

In addition, in Comparative Example 2 in which a denture is produced through use of a reference denture having the same planar shape as that of Example 1 but having a large height and a large thickness, an adjustment allowance is hardly formed, and the denture comes into contact with the patient oral cavity model. Thus, it is required to adjust the reference denture having a large height and a large thickness to the oral cavity by grinding, and the height adjustment allowance ratio becomes 0%, with the result that both the adjustment time and the production time become significantly long as compared to Example 1.

In the Reference Example, there is described production time required for producing a denture by the customization method so that the denture is adapted to one set of patient oral cavity model randomly selected from the above-mentioned 2020 sets of patient oral cavity models.

[2. With Regard to Production Method of Present Invention]

Examples 1 to 12

As described above, Examples 1 to 12 are examples in each of which a denture was produced by the production method of the present invention. In these Examples, the building and transfer step (C) is divided into multiple stages. The transfer in the step (C1) is performed, and then (C2) and (C3) are performed without performing the step (D1). In

TABLE 4

| | | Evaluation result | | | | |
|---|---|---|---|---|---|---|
| | | Adaptability ratio (%) | Non-lifting ratio (%) | Production time (%) | Adjustment time (%) | Height adjustment allowance ratio (%) |
| Example | 1 | 90 | 100 | 16 | 20 | 34 |
| | 2 | 90 | 100 | 16 | 20 | 43 |
| | 3 | 90 | 100 | 16 | 20 | 25 |
| | 4 | 90 | 100 | 16 | 20 | 61 |
| | 5 | 90 | 100 | 16 | 20 | 8 |
| | 6 | 90 | 100 | 16 | 20 | 70 |
| | 7 | 90 | 85 | 18 | 40 | 4 |
| | 8 | 90 | 100 | 16 | 20 | 34 |
| | 9 | 90 | 95 | 17 | 30 | 34 |
| | 10 | 90 | 60 | 21 | 60 | 34 |
| | 11 | 60 | 95 | 17 | 30 | 34 |
| | 12 | 60 | 80 | 18 | 40 | 34 |
| Comparative Example | 1 | 10 | 5 | 26 | 100 | 0 |
| | 2 | 90 | 50 | 23 | 80 | 0 |
| Reference Example | | — | — | 100 | — | — |

(C2) and (C3), the maxillary reference denture and the mandibular reference denture each having a curable denture base material in an uncured state built thereon were separately inserted into the articulator through use of the positioning jig, and held at the appropriate position to perform transfer and formation of a margin. In this case, the transfer and formation of a margin were able to be performed at the appropriate position at one time without failure.

Comparative Example 3

This Comparative Example is an example in which the building and transfer step (C) was performed in one stage, and the state in this case was checked. Specifically, a curable denture base material in an uncured state was built on each mucosal surface of the base central region, the base anterior region, and the base posterior region of the maxillary reference denture through use of the same reference denture as that of Example 1. The transfer was performed in the same manner except for holding the maxillary reference denture having all the curable denture base materials built thereon on the positioning jig, inserting the resultant into the articulator, and pressing the mucosal surfaces thereof against the mucosal surfaces of the maxillary patient oral cavity model. In this case, a margin was formed under a state in which the position was not determined. Accordingly, the position was liable to be displaced from the appropriate position, and the curable denture base material built on the base posterior region was brought into contact with the model to be deformed at the time of insertion. In addition, the curable denture base material extruded at the time of being pressed with slight inclination moved to an inner side, and the excess curable denture base material did not successfully extend from the margin of the reference denture base. Thus, the satisfactory transfer was not able to be performed at one time. By the time when the satisfactory transfer and formation of a margin were able to be finally performed, it was required to repeat, several times, the operation involving taking out the reference denture base from the articulator after the first transfer, removing a small amount of the excess curable denture base material, partially adding the curable denture base material, inserting the reference denture base again, and then, performing the subsequent transfer. Accordingly, the production time was significantly long as compared to Example 1.

REFERENCE SIGNS LIST 1 denture
1A maxillary denture
1B mandibular denture
1A4, 1B4 mucosal surface
1A5, 1B5 polished surface
1A6, 1B6 denture border
1A7, 1B7 cervical line
1A8, 1B8 flange
2 denture base
2A maxillary denture base
2B mandibular denture base
2A1, 2B1 central region
2A2, 2B2 anterior region (anterior flange portion)
2A3 posterior region (palatal plate portion)
2B3 posterior region (lingual flange portion)
4 reference denture base member
4A maxillary reference denture base member
4B mandibular reference denture base member
5 reference denture member
5A maxillary reference denture member
5B mandibular reference denture member
6 adjusting member
6A1, 6B1 central adjusting member
6A2, 6B2 anterior adjusting member
6A3 posterior adjusting member (palatal plate adjusting portion)
6B3 posterior adjusting member (lingual flange adjusting portion)
10 reference denture (of present invention) (corresponding to reference denture member)
10A maxillary reference denture (of present invention) (corresponding to maxillary reference denture member)
10B mandibular reference denture (of present invention) (corresponding to mandibular reference denture member)
20 reference denture base (corresponding to reference denture base member)
20A maxillary reference denture base (corresponding to maxillary reference denture base member)
20B mandibular reference denture base (corresponding to mandibular reference denture base member)
20A1, 20B1 base central region
20A2, 20B2 base anterior region (base anterior flange portion)
20A3 base posterior region (base palatal plate portion)
20A3a mucosal surface of base palatal plate portion
20B3 base posterior region (base lingual flange portion)
20B3a mucosal surface of base lingual flange portion
21A, 21B flange
21B2 lingual flange
22A, 22B denture border
22A1, 22B1 labial flange border
22A2, 22B2 buccal flange border
23A, 23B mucosal surface
24A, 24B polished surface
30, 30A, 30B artificial dentition
31, 31A, 31B artificial tooth
31A1, 31B1 artificial central incisor
31A3, 31B3 artificial canine (canine artificial tooth)
31A3$p$, 31B3$p$ cusp tip of artificial canine
31A6, 31B6 artificial first molar
31A6$p$, 31B6$p$ mesiobuccal cusp tip of artificial first molar
31A7, 31B7 artificial second molar
PA imaginary occlusal plane
A1 midpoint of mesial angle of each of left and right central incisors of mandibular reference denture
A2 distobuccal cusp tip of left second molar of mandibular reference denture
A3 distobuccal cusp tip of right second molar of mandibular reference denture
HA highest point of base palatal plate portion
HB height of denture border side distal end of base lingual flange portion
LA1, LB1 height difference between denture border side distal end of base anterior region and cusp tip of artificial canine in artificial canine vertical cross-section
LA2 height difference between highest point of base palatal plate portion and cusp tip of artificial canine in artificial canine vertical cross-section
LB2 height difference between denture border side distal end of base lingual flange portion and cusp tip of artificial canine in artificial canine vertical cross-section LA3, LB3 height difference between denture border side distal end of base anterior region and mesiobuccal cusp tip of artificial first molar in artificial first molar vertical cross-section LA4 height difference between highest point of base palatal plate portion and mesiobuccal cusp tip of artificial first molar in artificial first molar vertical cross-section LB4 height difference between denture border side distal end of base lingual flange portion and mesiobuccal cusp tip of artificial first molar in artificial first molar vertical cross-section 100 articulator
101 guide pin
150 patient oral cavity model
151 maxillary model
152 mandibular model
200 positioning jig
201 reference denture holding portion
201A maxillary denture holding recess
201B mandibular denture holding recess
202 handle portion

The invention claimed is:

1. A production method for a denture, comprising:
(A) a reference denture preparation step of preparing a reference denture serving as a reference denture member including a reference denture base member and artificial teeth;
(B) a reference denture determination step of determining a shape of the reference denture to be used by (1) inserting the reference denture into an oral cavity of a patient, aligning the reference denture with respect to an occlusal plane of the patient, and then checking a contact state between a mucosa in the oral cavity of the patient and the reference denture or (2) inserting the reference denture into an articulator having a patient oral cavity model attached thereto, aligning the reference denture with respect to an occlusal plane of the patient oral cavity model, and then checking a contact state between the patient oral cavity model and the reference denture, selecting, in a case of an inappropriate contact, to return to (A) the reference denture preparation step for preparing a new reference denture having another shape that does not cause the inappropriate contact or finely adjusting a shape of the reference denture base member of the reference denture so as to prevent the inappropriate contact;
(C1) a central building and transfer step of placing a curable denture base material in an uncured state for forming an adjusting member on a base central region of a mucosal surface of the reference denture base member of the reference denture selected in the reference denture determination step, then aligning the reference denture having the curable denture base material thereon with respect to (a) the occlusal plane of the patient or (b) the occlusal plane of the patient oral cavity model at the articulator, and transferring a mucosal shape of the oral cavity of the patient or a shape of the patient oral cavity model onto the curable denture base material;
(C2) an anterior building and transfer step of placing a curable denture base material in an uncured state for forming an adjusting member on a base anterior region of the mucosal surface of the reference denture base member of the reference denture selected in the reference denture determination step, then aligning the reference denture having the curable denture base material thereon with respect to (a) the occlusal plane of the patient or (b) the occlusal plane of the patient oral cavity model at the articulator, and transferring a mucosal shape of the oral cavity of the patient or a shape of the patient oral cavity model onto the curable denture base material and simultaneously extending the curable denture base material from a denture border of the base anterior region to form a margin in an anterior region of the denture to remove excess curable denture base material;
(C3) a posterior building and transfer step of placing a curable denture base material in an uncured state for forming an adjusting member on a base posterior region of the mucosal surface of the reference denture base member of the reference denture selected in the reference denture determination step, then aligning the reference denture having the curable denture base material thereon with respect to (a) the occlusal plane of the patient or (b) the occlusal plane of the patient oral cavity model at the articulator, and transferring a mucosal shape of the oral cavity of the patient or a shape of the patient oral cavity model onto the curable denture base material and simultaneously extending the curable denture base material from the denture border of the posterior region to form a margin in a posterior region of the denture to remove excess curable denture base material;
(D1) a first curing step of curing the curable denture base material used in the central building and transfer step (C1) after performing the central building and transfer step (C1),
(D2) a second curing step of curing the curable denture base material used in the anterior building and transfer step (C2) after performing the anterior building and transfer step (C2), and
(D3) a third curing step of curing the curable denture base material used in the posterior building and transfer step (C3) after performing the posterior building and transfer step (C3),
wherein, after the central building and transfer step (C1) is performed, the anterior building and transfer step (C2) and the posterior building and transfer step (C3) are performed simultaneously or individually, and
wherein the first curing step, the second curing step and the third curing step are performed individually, or at least two steps selected from the group consisting of the first curing step, the second curing step and the third curing step are performed simultaneously.

2. The production method for the denture according to claim 1, further comprising, after completion of the anterior building and transfer step and the posterior building and transfer step, a wash step of adding additional curable denture base material in an uncured state onto a surface on a mucosal surface side of the reference denture base member to correct a shape of the surface on the mucosal surface side.

* * * * *